United States Patent
Huang et al.

(10) Patent No.: US 12,460,240 B2
(45) Date of Patent: Nov. 4, 2025

(54) FUNGAL CELL WITH IMPROVED PROTEIN PRODUCTION CAPACITY

(71) Applicant: Melt&Marble AB, Gothenburg (SE)

(72) Inventors: Mingtao Huang, Gothenburg (SE); Anastasia Krivoruchko, Gothenburg (SE); Florian David, Gothenburg (SE); Jens Nielsen, Gothenburg (SE)

(73) Assignee: Melt & Marble AB, Gothenburg (SE)

( * ) Notice: Subject to any disclaimer, the term of this patent is extended or adjusted under 35 U.S.C. 154(b) by 0 days.

(21) Appl. No.: 18/467,788

(22) Filed: Sep. 15, 2023

(65) Prior Publication Data

US 2025/0092436 A1  Mar. 20, 2025

Related U.S. Application Data

(62) Division of application No. 16/634,267, filed as application No. PCT/SE2018/050779 on Jul. 30, 2018, now Pat. No. 11,795,487.

(30) Foreign Application Priority Data

Jul. 31, 2017  (SE) .................................. 1750968-8

(51) Int. Cl.
| | | |
|---|---|---|
| C12P 21/00 | (2006.01) | |
| C07K 14/39 | (2006.01) | |
| C07K 14/395 | (2006.01) | |
| C12N 1/18 | (2006.01) | |
| C12P 21/02 | (2006.01) | |

(52) U.S. Cl.
CPC ............ *C12P 21/00* (2013.01); *C07K 14/395* (2013.01); *C12N 1/185* (2021.05); *C12P 21/02* (2013.01)

(58) Field of Classification Search
CPC ........ C12P 21/00; C07K 14/39; C07K 14/395
See application file for complete search history.

(56) References Cited

U.S. PATENT DOCUMENTS

2013/0011875 A1  1/2013  Meehl et al.

FOREIGN PATENT DOCUMENTS

| WO | 2004003217 A1 | 1/2004 |
|---|---|---|
| WO | 2013102674 A2 | 7/2013 |

OTHER PUBLICATIONS

Raj et al., Antimicrobial Agents and Chemotherapy, 60(3), 1438-1449, Mar. 2016.*
"Batten Disease Fact Sheet", National Institute of Neurological Disorders and Stroke. Retrieved on May 17, 2021.
International Search Report and Written Opinion corresponding to International Patent Application No. PCT/SE2018/050779, mailed Oct. 8, 2018, 10 pages.
Huang, et al., "Appendix 1 for Engineering the protein secretory pathway of *Saccharomyces cerevisiae* enables improved protein production", PNAS 115(47) E11025-E11032 (2018). Retrieved from www.pnas.org/cgi/doi/10.1073/pnas.1809921115 on May 17, 2023.
Huang, Mingtao, et al., "Microfluidic screening and whole-genome sequencing identifies mutations associated with improved protein secretion by yeast", PNAS 112(34), 2015, E4689-E4696.
Huang, et al., "Supporting Information for Microfluidic screening and whole-genome sequencing identifies mutations associated with improved protein secretion by yeast", PNAS 112 (34) E4689-E4696 (2015). Retrieved from www.pnas.org/lookup/suppl/doi:10.1073/pnas.1506460112/-/DCSupplemental on May 17, 2023.
Kanneganti, et al., ""Btn3 is negative regulator of Btn2-mediated endosomal protein trafficking and prion curing in yeast" Molecular Biology of the Cell, 22(10):1648-1663 (2011)".
Legner, E.F., "Netlinks to families of the Fungi Kingdom", Univ. California Riverside, 2020.
Morvan, Joelle, et al., "Btn3 regulates the endosomal sorting function of the yeast Ent3 epsin, an adaptor for SNARE proteins", Journal of Cell Science 128(4), 2015, 706-716.
True, Heather L., et al., "A yeast prion provides a mechanism for genetic variation and phenotypic diversity", Nature. 407, 2000, 477-483.
Tyedmers, Jens, et al., "Prion Switching in Response to Environmental Stress", PLoS Biology. 6(11): e294, 2008, 2605-2613.

* cited by examiner

*Primary Examiner* — Maryam Monshipouri
(74) *Attorney, Agent, or Firm* — Myers Bigel, P.A.

(57) ABSTRACT

The present invention related to the provision of genetically modified fungal cells, such as yeast cells with an improved ability for producing and secreting different recombinant proteins. The improved ability is obtained by disruption in intracellular transport between the Golgi and the endosome. In particular embodiments, the disruption is achieved by downregulation or deletion of the gene encoding a Tda3p homolog. The fungal cell and method of the invention would allow for large-scale production of recombinant proteins in fungal cells.

15 Claims, 8 Drawing Sheets
Specification includes a Sequence Listing.

FUNGAL CELL WITH IMPROVED PROTEIN PRODUCTION CAPACITY

STATEMENT OF PRIORITY

This application is a divisional of and claims priority to U.S. patent application Ser. No. 16/634,267, filed on Jan. 27, 2020, which is a 35 U.S.C. § 371 national phase application of International Application Serial No. PCT/SE2018/050779, filed Jul. 30, 2018, which claims the benefit, under 35 U.S.C. § 119(a), of Swedish Patent Application No. 1750968-8; filed Jul. 31, 2017, the entire contents of which are incorporated by reference herein.

STATEMENT REGARDING ELECTRONIC FILING OF A SEQUENCE LISTING

A Sequence Listing in XML text format, submitted under 37 C.F.R. § 1.821-1.834, entitled 9737-77DV_ST26.xml, 104,873 bytes in size, generated on Sep. 13, 2023 and filed electronically, is provided in lieu of a paper copy. This Sequence Listing is hereby incorporated herein by reference into the specification for its disclosures.

TECHNICAL FIELD

The present invention relates generally to the development of genetically engineered microorganisms. More specifically the invention relates to fungal cells containing modifications allowing production and secretion of high levels of recombinant proteins.

BACKGROUND

Production of recombinant proteins by fungal cells plays an important role in various industries. For example, various industrial enzymes and biopharmaceuticals are produced by fungal systems. It is therefore desirable to develop fungal platform strains that are able to produce high levels of different recombinant proteins.

Various research efforts have been aimed at creating platform strains for protein production via genetic engineering of the host cell. For example, several studies have aimed to increase recombinant protein production by increasing the protein folding capacity of the cell. Tang et al (Biotechnol Bioeng. 2015 September; 112(9):1872-82. doi:10.1002/bit.25596) over-expressed the endoplasmic reticulum (ER) chaperone protein BiP and the disulfide isomerase Pdi1p in yeast, and thereby managed to increase the secretion of three heterologous proteins, β-glucosidase, endoglucanase, and α-amylase. In addition Hou et al (Appl Microbiol Biotechnol. 2013 April; 97(8):3559-68. doi:10.1007/s00253-012-4596-9.) showed that overexpression of HSF1, a transcription factor that controls the expression of multiple protein chaperones, led to increased production of heterologous α-amylase, endogenous invertase and human insulin precursor. Another transcription factor, HAC1, is involved in the general unfolded protein response. It facilitates the expression of PDI or BiP in a cell, and has been successfully employed to obtain improved levels of production of antibodies by Gasser et al (Biotechnol Bioeng. 2006 Jun. 5; 94(2):353-61.). Koskela et al (Biotechnol J. 2017 Apr. 21. doi:10.1002/biot.201600631.) showed that expression of mammalian BiP, the co-chaperone GRP170, or the peptidyl-prolyl isomerase FKBP2 increased antibody production in yeast. De Ruijter et al (Microb Cell Fact. 2016 May 23; 15:87. doi:10.1186/s12934-016-0488-5.) have also shown that overexpression of the folding factor Cpr5p could lead to increased antibody production.

Other studies have focused on proteases and showed that deletion of proteases could lead to increased protein production. Tomimoto et al (Biosci Biotechnol Biochem. 2013; 77:2461-6) were able to obtain higher production of human interferon-β in yeast by disruption of the proteases encoded by PEP4 and PRB1. Furthermore, Choo et al (J Biotechnol. 2010 Aug. 20; 149:1-7. doi:10.1016/j.jbiotec.2010.06.014.) showed that disruption of various yapsin proteases reduced proteolytic degradation of human parathyroid hormone protein during fermentation.

Other studies have involved engineering of intracellular trafficking. Hou et al (Metab Eng. 2012 March; 14(2):120-7. doi:10.1016/j.ymben.2012.01.002) have shown that overexpression of Sec1p, a protein that is involved in exocytosis in *S. cerevisiae*, led to increased secretion of heterologous proteins human insulin precursor and α-amylase, and also the secretion of an endogenous protein invertase around 1.5x.

Other studies have also attempted to engineer the components involved in vesicle trafficking from the endoplasmic reticulum (ER) to the Golgi, and from the Golgi to the plasma membrane (PM). Bao et al (Appl Environ Microbiol. 2017. 5. pii: AEM.03400-16. doi:10.1128/AEM.03400-16.) have shown that overexpression of Sec16p, a protein involved in transport between the ER and the Golgi, led to increased secretion of heterologous α-amylase. Tang et al (Biotechnol Biofuels. 2017 Feb. 27; 10:53. doi:10.1186/s13068-017-738-8.) showed that engineering the targeted components in the ER to Golgi vesicle trafficking, including Sec12p, Sec13p, Erv25p and Bos1p, enhanced the extracellular activity of heterologous endoglucanase. In addition, over-expression of the components in the Golgi to plasma membrane vesicle trafficking, including Sso1p, Snc2p, Sec1p, Exo70p, Ypt32p and Sec4p, led to increased secretion of β-glucosidase. Van Zyl et al (Appl Microbiol Biotechnol. 2016 January; 100:505-18. doi:10.1007/s00253-015-7022-2.) have also demonstrated that production of heterologous cellobiohydrolase and β-glucosidase could be increased by single and co-overexpression of some of the endoplasmic reticulum (ER)-to-Golgi SNAREs (BOS1, BET1, SEC22 and SED5). Furthermore, the patent application US 2013/0011875 A1, discloses a *Pichia pastoris* cell with disrupted vacuolar sorting activity, wherein the disruption occurs through deletion of vacuolar protein sorting receptor 10 (Vps10), as well as disruption of one or more genes that encode a protein associated with recycling of Vps10 to the late Golgi.

A study by Huang et al (Proc Natl Acad Sci USA. 2015 Aug. 25; 112(34):E4689-96. doi:10.1073/pnas.1506460112.) reported combination of UV mutagenesis and microfluidic sorting to uncover potential targets and reported that deletion of HDA2, HDA3 and SNC2 in yeast results in increased protein production.

TDA3 (also known as BTN3) is a putative oxidoreductase and was shown to interact with both epsins Ent3 and Ent5. TDA3 is a negative regulator of the Batten-disease-linked protein Btn2 involved in the retrieval of specific SNAREs (Vti1, Snc1, Tlg1 and Tlg2) from the late endosome to the Golgi. It was suggested that TDA3 sequesters Btn2 away from its substrates, thus down-regulating protein trafficking and aggregation. It was shown that in btn34 mutant cells, endosomal sorting of ubiquitylated cargos and endosomal recycling of the Snc1 SNARE are delayed.

COG5 is a component of the conserved oligomeric Golgi complex that functions in protein trafficking to mediate fusion of transport vesicles to Golgi compartments

SUMMARY

It is a general objective to provide an improved fungal cell.

It is a particular objective to provide a fungal cell that can be used for fermentation-based production of recombinant proteins.

These and other objectives are met by embodiments as disclosed herein.

An aspect of the embodiments relates to a fungal cell. According to the embodiments, the fungal cell lacks a gene encoding Tda3p or comprises a disrupted endogenous gene encoding Tda3p. The fungal cell also comprises a gene encoding a recombinant protein.

Another aspect of the embodiments relates to a method for producing a recombinant protein. The method comprises culturing a fungal cell according to any of the embodiments in a culture medium and in culture conditions suitable for production of the recombinant protein by the fungal cell. The method also comprises collecting the recombinant protein from the culture medium and/or from the fungal cell.

The fungal cell of the embodiments comprises modifications to intracellular transport between the Golgi and the endosome, combined with expression of a recombinant protein.

BRIEF DESCRIPTION OF THE DRAWINGS

The embodiments, together with further objects and advantages thereof, may best be understood by making reference to the following description taken together with the accompanying drawings, in which.

DETAILED DESCRIPTION OF THE INVENTION AND PREFERRED EMBODIMENTS THEREOF

Figure 1:
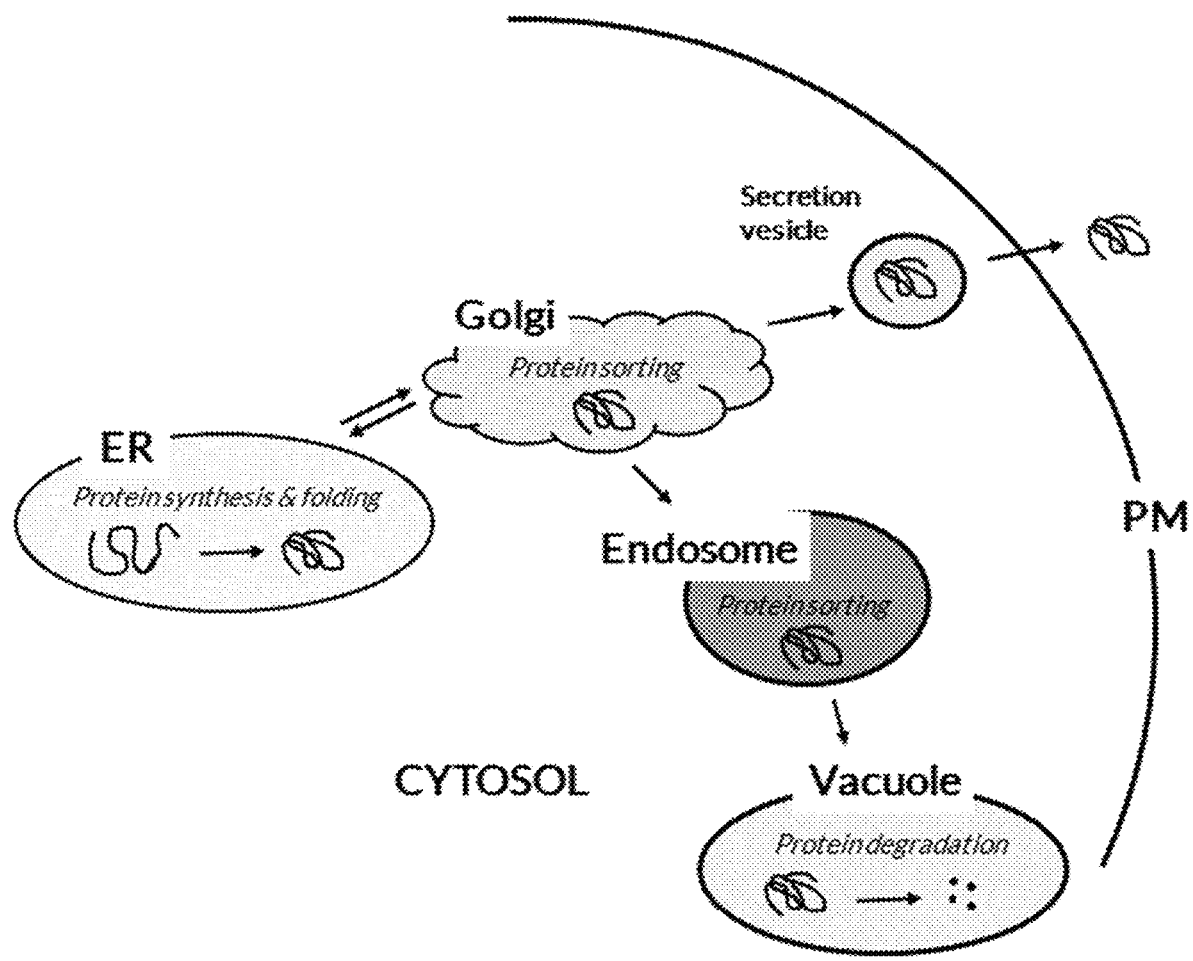
FIG. 1: Overview of the intracellular trafficking in a fungal cell. Proteins are transported from the endoplasmic reticulum (ER) to the Golgi, where they are sorted into anterograde transport vesicles for ER resident proteins, into secretory vesicles for plasma membrane (PM) and secretion, and into vacuolar protein sorting vesicles for vacuolar proteins passing through the endosomes. The present invention involves disruption of transport between the Golgi and the endosome.

The present invention now will be described hereinafter with reference to the accompanying drawings and examples, in which embodiments of the invention are shown. This description is not intended to be a detailed catalogue of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. Thus, the invention contemplates that in some embodiments of the invention, any feature or combination of features set forth herein can be excluded or omitted. In addition, numerous variations and additions to the various embodiments suggested herein will be apparent to those skilled in the art in light of the instant disclosure, which do not depart from the instant invention. Hence, the following descriptions are intended to illustrate some particular embodiments of the invention, and not to exhaustively specify all permutations, combinations and variations thereof.

Unless otherwise defined herein, scientific and technical terms used herein will have the meanings that are commonly understood by those of ordinary skill in the art.

Generally, nomenclatures used in connection with techniques of biochemistry, enzymology, molecular and cellular biology, microbiology, genetics and protein and nucleic acid chemistry and hybridization, described herein, are those well-known and commonly used in the art.

Conventional methods and techniques mentioned herein are explained in more detail, for example, in Molecular Cloning, a laboratory manual [second edition] Sambrook et al. Cold Spring Harbor Laboratory, 1989, for example in Sections 1.21 "Extraction And Purification Of Plasmid DNA", 1.53 "Strategies For Cloning In Plasmid Vectors", 1.85 "Identification Of Bacterial Colonies That Contain Recombinant Plasmids", 6 "Gel Electrophoresis Of DNA", 14 "In vitro Amplification Of DNA By The Polymerase Chain Reaction", and 17 "Expression Of Cloned Genes In *Escherichia coli*" thereof.

Enzyme Commission (EC) numbers (also called "classes" herein), referred to throughout this specification, are according to the Nomenclature Committee of the International Union of Biochemistry and Molecular Biology (NC-IUBMB) in its resource "Enzyme Nomenclature" (1992, including Supplements 6-17) available, for example, as "Enzyme nomenclature 1992: recommendations of the Nomenclature Committee of the International Union of Biochemistry and Molecular Biology on the nomenclature and classification of enzymes", Webb, E. C. (1992), San Diego: Published for the International Union of Biochemistry and Molecular Biology by Academic Press (ISBN 0-12-227164-5). This is a numerical classification scheme based on the chemical reactions catalyzed by each enzyme class.

The terminology used in the description of the invention herein is for the purpose of describing particular embodiments only and is not intended to be limiting of the invention.

All publications, patent applications, patents and other references cited herein are incorporated by reference in their entireties for the teachings relevant to the sentence and/or paragraph in which the reference is presented.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a composition comprises components A, B and C, it is specifically intended that any of A, B or C, or a combination thereof, can be omitted and disclaimed singularly or in any combination.

As used in the description of the invention and the appended claims, the singular forms "a," "an" and "the" are intended to include the plural forms as well, unless the context clearly indicates otherwise.

Also as used herein, "and/or" refers to and encompasses any and all possible combinations of one or more of the associated listed items, as well as the lack of combinations when interpreted in the alternative ("or").

Throughout the description and claims of this specification, the words "comprise" and "contain" and variations of the words, for example "comprising" and "comprises", mean "including but not limited to" and do not exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

As used herein, the transitional phrase "consisting" essentially of means that the scope of a claim is to be interpreted to encompass the specified materials or steps recited in the claim and those that do not materially affect the basic and novel characteristic(s) of the claimed invention. Thus, the term "consisting essentially of when used in a claim of this invention is not intended to be interpreted to be equivalent to "comprising."

To facilitate understanding of the invention, a number of terms are defined below.

Also as used herein, the terms "nucleotide sequence" "nucleic acid," "nucleic acid molecule," "oligonucleotide" and "polynucleotide" refer to RNA or DNA, including cDNA, a DNA fragment or portion, genomic DNA, synthetic DNA, plasmid DNA, mRNA, and anti-sense RNA, any of which can be single stranded or double stranded, linear or branched, or a hybrid thereof. Nucleic acid molecules and/or nucleotide sequences provided herein are presented herein in the 5' to 3' direction, from left to right and are represented using the standard code for representing the nucleotide characters as set forth in the U.S. sequence rules, 37 CFR §§ 1.821-1.825 and the World Intellectual Property Organization (WIPO) Standard ST.25. When dsRNA is produced synthetically, less common bases, such as inosine, 5-methylcytosine, 6-methyladenine, hypoxanthine and others can also be used for antisense, dsRNA, and ribozyme pairing. For example, polynucleotides that contain C-5 propyne analogues of uridine and cytidine have been shown to bind RNA with high affinity and to be potent antisense inhibitors of gene expression. Other modifications, such as modification to the phosphodiester backbone, or the 2'-hydroxy in the ribose sugar group of the RNA can also be made.

As used herein the term "recombinant" when applied to nucleic acid means that a particular nucleic acid (DNA or RNA) is the product of various combinations of fusion, cloning, restriction, genetic recombination and/or ligation steps resulting in a construct having a structural coding or non-coding sequence distinguishable from endogenous nucleic acids found in natural systems. The term "recombinant protein" refers to protein that can result from the expression of recombinant DNA within a cell.

As used herein, the term "gene" refers to a nucleic acid molecule capable of being used to produce mRNA, antisense RNA, miRNA, anti-microRNA antisense oligodeoxyribonucleotide (AMO) and the like. Genes may or may not be capable of being used to produce a functional protein or gene product. Genes can include both coding and non-coding regions, e.g. introns, regulatory elements, promoters, enhancers, termination sequences and/or 5' and 3' untranslated regions. A gene may be "isolated" by which is meant a nucleic acid that is substantially or essentially free from components normally found in association with the nucleic acid in its natural state. Such components include other cellular material, culture medium from recombinant production, and/or various chemicals used in chemically synthesizing the nucleic acid.

A "disrupted gene" as defined herein involves any mutation or modification to a gene resulting in a partial or fully non-functional gene and gene product. Such a mutation or modification includes, but is not limited to, a missense mutation, a nonsense mutation, a deletion, a substitution, an insertion, addition of a targeting sequence and the like. Furthermore, a disruption of a gene can be achieved also, or alternatively, by mutation or modification of control elements controlling the transcription of the gene, such as mutation or modification in a promoter, terminator and/or enhancement elements. In such a case, such a mutation or modification results in partially or fully loss of transcription of the gene, i.e. a lower or reduced transcription as compared to native and non-modified control elements. As a result a reduced, if any, amount of the gene product will be available following transcription and translation. Furthermore, disruption of a gene could also entail adding or removing a localization signal from the gene, resulting in decreased presence of the gene product in its native subcellular compartment.

The objective of gene disruption is to reduce the available amount of the gene product, including fully preventing any production of the gene product, or to express a gene product that lacks or having lower enzymatic activity as compared to the native or wild type gene product.

A "codon optimized" version of a gene refers to an exogenous gene introduced into a cell and where the codons of the gene have been optimized with regard to the particular cell. Generally, not all tRNAs are expressed equally or at the same level across species. Codon optimization of a gene sequence thereby involves changing codons to match the most prevalent tRNAs, i.e. to change a codon recognized by a low prevalent tRNA with a synonymous codon recognized by a tRNA that is comparatively more prevalent in the given cell. This way the mRNA from the codon optimized gene will be more efficiently translated. The codon and the synonymous codon preferably encode the same amino acid.

As used herein, the term "allele" refers to a variant form of a given gene. This can include a mutated form of a gene where one or more of the amino acids encoded by the gene have been removed or substituted by a different amino acid.

As used herein, the terms "peptide", "polypeptide", and "protein" are used interchangeably to indicate to a polymer of amino acid residues. The terms "peptide", "polypeptide" and "protein" also includes modifications including, but not limited to, lipid attachment, glycosylation, glycosylation, sulfation, hydroxylation, γ-carboxylation of L-glutamic acid residues and ADP-ribosylation.

As used herein, the term "enzyme" is defined as a protein which catalyzes a chemical or a biochemical reaction in a cell. Usually, according to the present invention, the nucleotide sequence encoding an enzyme is operably linked to a nucleotide sequence (promoter) that causes sufficient expression of the corresponding gene in the cell to confer to the cell the ability to produce desired metabolites.

As used herein, the term "open reading frame (ORF)" refers to a region of RNA or DNA encoding polypeptide, a peptide, or protein.

As used herein, the term "genome" encompasses both the plasmids and chromosomes in a host cell. For instance, encoding nucleic acids of the present disclosure which are introduced into host cells can be portion of the genome whether they are chromosomally integrated or plasmids-localized.

As used herein, the term "promoter" refers to a nucleic acid sequence which has functions to control the transcription of one or more genes, which is located upstream with respect to the direction of transcription of the transcription initiation site of the gene. Suitable promoters in this context include both constitutive and inducible natural promoters as well as engineered promoters, which are well known to the person skilled in the art.

Suitable promoters for use in fungal cells may be the promoters of PDC, GPD1, TEF1, PGK1 and TDH. Other suitable promoters include the promoters of GAL1, GAL2, GAL10, GAL7, CUP1, HIS3, CYC1, ADH1, PGL, GAPDH, ADC1, URA3, TRP1, LEU2, TP1, AOX1 and ENO1.

As used herein, the term "terminator" refers to a "transcription termination signal" if not otherwise noted. Terminators are sequences that hinder or stop transcription of a polymerase.

As used herein, "recombinant fungal cells" according to the present disclose is defined as cells which contain additional copies or copy of an endogenous nucleic acid sequence or are transformed or genetically modified with polypeptide or a nucleotide sequence that does not naturally occur in the fungal cells. The wildtype fungal cells are defined as the parental cells of the recombinant fungal cells, as used herein.

As used herein, the terms "increase," "increases," "increased," "increasing," "enhance," "enhanced," "enhancing," and "enhancement" (and grammatical variations thereof) indicate an elevation of at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more, or any range therein, as compared to a control.

As used herein, the terms "reduce," "reduces," "reduced," "reduction," "diminish," "suppress," and "decrease" and similar terms mean a decrease of at least about, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 95%, 100%, 150%, 200%, 300%, 400%, 500% or more, or any range therein, as compared to a control.

A "reduced expression" of a gene as used herein involves a genetic modification that reduces the transcription of the gene, reduces the translation of the mRNA transcribed from the gene and/or reduces post-translational processing of the protein translated from the mRNA. Such genetic modification includes insertion(s), deletion(s), replacement s) or mutation(s) applied to the control sequence, such as a promoter and enhancer, of the gene. For instance, the promoter of the gene could be replaced by a less active or inducible promoter to thereby result in a reduced transcription of the gene. Also a knock-out of the promoter would result in reduced, typically zero, expression of the gene.

As used herein the terms "knock-out" or "deletion" or "disruption" refers to a gene that is inoperative or knocked out and/or a nonfunctional gene product, e.g. a polypeptide having essentially no activity, e.g. less than about 10% or even 5% as compared to the activity of the wild type polypeptide.

As used herein, the term "portion" or "fragment" of a nucleotide sequence of the invention will be understood to mean a nucleotide sequence of reduced length relative to a reference nucleic acid or nucleotide sequence and comprising, consisting essentially of and/or consisting of a nucleotide sequence of contiguous nucleotides identical or almost identical, e.g. 80%, 81%, 82%, 83%, 84%, 85%, 86%, 87%, 88%, 89%, 90%, 91%, 92%, 93%, 94%, 95%, 96%, 98%, 99% identical, to the reference nucleic acid or nucleotide sequence. Such a nucleic acid fragment or portion according to the invention may be, where appropriate, included in a larger polynucleotide of which it is a constituent.

Different nucleic acids or proteins having homology are referred to herein as "homologues." The term homologue includes homologous sequences from the same and other species and orthologous sequences from the same and other species. "Homology" refers to the level of similarity between two or more nucleic acid and/or amino acid sequences in terms of percent of positional identity, i.e. sequence similarity or identity. Homology also refers to the concept of similar functional properties among different nucleic acids or proteins. Thus, the compositions and methods of the invention further comprise homologues to the nucleotide sequences and polypeptide sequences of this invention. "Orthologous," as used herein, refers to homologous nucleotide sequences and/or amino acid sequences in different species that arose from a common ancestral gene during speciation. A homologue of a nucleotide sequence of this invention has a substantial sequence identity, e.g. at least about 70%, 75%, 80%, 81%, 82%, 83%, 84%, 85%, 86%, 87%, 88%, 89%, 90%, 91%, 92%, 93%, 94%, 95%, 96%, 97%, 98%, 99%, and/or 100%, to said nucleotide sequence.

The term "overexpress," "overexpresses" or "overexpression" as used herein refers to higher levels of activity of a gene, e.g. transcription of the gene; higher levels of translation of mRNA into protein; and/or higher levels of production of a gene product, e.g. polypeptide, than would be in the cell in its native or control, e.g. not transformed with the particular heterologous or recombinant polypeptides being overexpressed, state. A typical example of an overexpressed gene is a gene under transcription control of another promoter as compared to the native promoter of the gene. Also, or alternatively, other changes in the control elements of a gene, such as enhancers, could be used to overexpress the particular gene. Furthermore, modifications that affect, i.e. increase, the translation of the mRNA transcribed from the gene could, alternatively or in addition, be used to achieve an overexpressed gene as used herein. These terms can also refer to an increase in the number of copies of a gene and/or an increase in the amount of mRNA and/or gene product in the cell. Overexpression can result in levels that are 25%, 50%, 100%, 200%, 500%, 1000%, 2000% or higher in the cell, or any range therein, as compared to control levels.

As used herein, the terms "exogenous" or "heterologous" when used with respect to a nucleic acid (RNA or DNA), protein or gene refer to a nucleic acid, protein or gene which occurs non-naturally as part of the cell, organism, genome, RNA or DNA sequence into which it is introduced, including non-naturally occurring multiple copies of a naturally occurring nucleotide sequence. Such an exogenous gene could be a gene from another species or strain, a modified, mutated or evolved version of a gene naturally occurring in the host cell or a chimeric version of a gene naturally occurring in the host cell or fusion genes. In these former cases, the modification, mutation or evolution causes a change in the nucleotide sequence of the gene to thereby obtain a modified, mutated or evolved gene with another nucleotide sequence as compared to the gene naturally occurring in the host cell. Evolved gene refers to genes encoding evolved genes and obtained by genetic modification, such as mutation or exposure to an evolutionary pressure, to derive a new gene with a different nucleotide sequence as compared to the wild type or native gene. A chimeric gene is formed through the combination of portions of one or more coding sequences to produce a new gene. These modifications are distinct from a fusion gene, which merges whole gene sequences into a single reading frame and often retain their original functions.

An "endogenous", "native" or "wild type" nucleic acid, nucleotide sequence, polypeptide or amino acid sequence refers to a naturally occurring or endogenous nucleic acid, nucleotide sequence, polypeptide or amino acid sequence. Thus, for example, a "wild type mRNA" is an mRNA that is naturally occurring in or endogenous to the organism. A "homologous" nucleic acid sequence is a nucleotide sequence naturally associated with a host cell into which it is introduced.

As used herein, the term "modified", when it is used with respect to an organism, refers to a host organism that has been modified to increase production of proteins, as compared with an otherwise identical host organism that has not been so modified. In principle, such "modification" in accordance with the present disclosure may comprise any physiological, genetic, chemical, or other modification that appropriately alters production of proteins in a host organism as compared with such production in an otherwise identical organism which is not subject to the said modification. In most of the embodiments, however, the modification will comprise a genetic modification. In certain embodiments, as described herein, the modification comprises introducing genes into a host cell, and particularly into a host cell which is disrupted in the Golgi-endosome trafficking. In some embodiments, a modification comprises at least one physiological, chemical, genetic, or other modification; in other embodiments, a modification comprises more than one chemical, genetic, physiological, or other modification. In certain aspects where more than one modification is made use of, such modifications can include any combinations of physiological, genetic, chemical, or other modification (e.g., one or more genetic, chemical and/or physiological modification(s)). Genetic modifications which boost the activity of a polypeptide include, but are not limited to: introducing one or more copies of a gene encoding the polypeptide (which may distinguish from any gene already present in the host cell encoding a polypeptide having the same activity); altering a gene present in the cell to increase transcription or translation of the gene (e.g., altering, adding additional sequence to, replacement of one or more nucleotides, deleting sequence from, or swapping for example, regulatory, a promoter or other sequence); and altering the sequence (e.g. non-coding or coding) of a gene encoding the polypeptide to boost activity (e.g., by increasing enzyme activity, decrease feedback inhibition, targeting a specific subcellular location, boost mRNA stability, boost protein stability). Genetic modifications that reduce activity of a polypeptide include, but are not limited to: deleting a portion or all of a gene encoding the polypeptide; inserting a nucleic acid sequence which disrupts a gene encoding the polypeptide; changing a gene present in the cell to reduce transcription or translation of the gene or stability of the mRNA or polypeptide encoded by the gene (for example, by adding additional sequence to, altering, deleting sequence from, replacement of one or more nucleotides, or swapping for example, replacement of one or more nucleotides, a promoter, regulatory or other sequence).

The term "overproducing" is used herein in reference to the production of proteins in a host cell and indicates that the host cell is producing more of protein by virtue of the introduction of nucleic acid sequences which encode different polypeptides involved in the host cell's metabolic pathways or as a result of other modifications as compared with the unmodified host cell or wild-type cell.

As used herein, the term "secretion" or "secreting" refers to the excretion of material, such as proteins from the cell.

As used herein, the term "flux", "metabolic flux" or "carbon flux" refers to the rate of turnover of molecules through a given reaction or a set of reactions. Flux in a metabolic pathway is regulated by the enzymes involved in the pathway. Pathways or reactions characterized by a state of increased flux compared to a control have an increased rate of generation of products from given substrates. Pathways or reactions characterized by a state of decreased flux compared to a control have a decreased rate of generation of products from given substrates. Flux towards products of interest can be increased by removing or decreasing competitive reactions or by increasing the activities of enzymes involved in generation of said products.

As used herein the term "vector" is defined as a linear or circular DNA molecule comprising a polynucleotide encoding a polypeptide of the invention, and which is operably linked to additional nucleotides that ensure its expression.

"Introducing" in the context of a yeast cell means contacting a nucleic acid molecule with the cell in such a manner that the nucleic acid molecule gains access to the interior of the cell. Accordingly, polynucleotides and/or nucleic acid molecules can be introduced yeast cells in a single transformation event, in separate transformation events. Thus, the term "transformation" as used herein refers to the introduction of a heterologous nucleic acid into a cell. Transformation of a yeast cell can be stable or transient.

"Transient transformation" in the context of a polynucleotide means that a polynucleotide is introduced into the cell and does not integrate into the genome of the cell.

By "stably introducing" or "stably introduced" in the context of a polynucleotide introduced into a cell, it is intended that the introduced polynucleotide is stably incorporated into the genome of the cell, and thus the cell is stably transformed with the polynucleotide.

"Stable transformation" or "stably transformed" as used herein means that a nucleic acid molecule is introduced into a cell and integrates into the genome of the cell. As such, the integrated nucleic acid molecule is capable of being inherited by the progeny thereof, more particularly, by the progeny of multiple successive generations. "Genome" as used herein includes the nuclear genome. Stable transformation as used herein can also refer to a nucleic acid molecule that is maintained extrachromasomally, for example, as a minichromosome.

Transient transformation may be detected by, for example, an enzyme-linked immunosorbent assay (ELISA) or Western blot, which can detect the presence of a peptide or polypeptide encoded by one or more nucleic acid molecules introduced into an organism. Stable transformation of a cell can be detected by, for example, a Southern blot hybridization assay of genomic DNA of the cell with nucleic acid sequences which specifically hybridize with a nucleotide sequence of a nucleic acid molecule introduced into an organism (e.g., a yeast). Stable transformation of a cell can be detected by, for example, a Northern blot hybridization assay of RNA of the cell with nucleic acid sequences which specifically hybridize with a nucleotide sequence of a nucleic acid molecule introduced into a yeast or other organism. Stable transformation of a cell can also be detected by, e.g., a polymerase chain reaction (PCR) or other amplification reaction as are well known in the art, employing specific primer sequences that hybridize with target sequence(s) of a nucleic acid molecule, resulting in amplification of the target sequence(s), which can be detected according to standard methods Transformation can also be detected by direct sequencing and/or hybridization protocols well known in the art.

Embodiments of the present invention also encompass variants of the polypeptides as defined herein. As used herein, a "variant" means a polypeptide in which the amino acid sequence differs from the base sequence from which it is derived in that one or more amino acids within the sequence are substituted for other amino acids. For example, a variant of SEQ ID NO:1 may have an amino acid sequence at least about 50% identical to SEQ ID NO:1, for example, at least about 55%, 60%, 65%, 70%, 75%, 80%, 85%, 90%, 91%, 92%, 93%, 94%, 95%, 96%, 97%, 98%, 99% or about 100% identical. The variants and/or fragments are functional variants/fragments in that the variant sequence has similar or identical functional enzyme activity characteristics to the enzyme having the non-variant amino acid sequence specified herein (and this is the meaning of the term "functional variant" as used throughout this specification).

A "functional variant" or "functional fragment" of any of the above amino acid sequences, therefore, is any amino acid sequence which remains within the same enzyme category (i.e., has the same EC number) as the non-variant sequences. Methods of determining whether an enzyme falls within a particular category are well known to the skilled person, who can determine the enzyme category without use of inventive skill. Suitable methods may, for example, be obtained from the International Union of Biochemistry and Molecular Biology.

Amino acid substitutions may be regarded as "conservative" where an amino acid is replaced with a different amino acid with broadly similar properties. Non-conservative substitutions are where amino acids are replaced with amino acids of a different type.

By "conservative substitution" is meant the substitution of an amino acid by another amino acid of the same class, in which the classes are defined as follows:

Class Amino Acid Examples

Nonpolar: A, V, L, I, P, M, F, W
Uncharged polar: G, S, T, C, Y, N, Q
Acidic: D, E
Basic: K, R, H.

As is well known to those skilled in the art, altering the primary structure of a polypeptide by a conservative substitution may not significantly alter the activity of that polypeptide because the side-chain of the amino acid which is inserted into the sequence may be able to form similar bonds and contacts as the side chain of the amino acid which has been substituted out. This is so even when the substitution is in a region which is critical in determining the polypeptide's conformation.

In embodiments of the present invention, non-conservative substitutions are possible provided that these do not interrupt the enzyme activities of the polypeptides, as defined elsewhere herein. The substituted versions of the enzymes must retain characteristics such that they remain in the same enzyme class as the non-substituted enzyme, as determined using the NC-IUBMB nomenclature discussed above.

Broadly speaking, fewer non-conservative substitutions than conservative substitutions will be possible without altering the biological activity of the polypeptides. Determination of the effect of any substitution (and, indeed, of any amino acid deletion or insertion) is wholly within the routine capabilities of the skilled person, who can readily determine whether a variant polypeptide retains the enzyme activity according to aspects of the invention. For example, when determining whether a variant of the polypeptide falls within the scope of the invention (i.e., is a "functional variant or fragment" as defined above), the skilled person will determine whether the variant or fragment retains the substrate converting enzyme activity as defined with reference to the NC-IUBMB nomenclature mentioned elsewhere herein. All such variants are within the scope of the invention.

Using the standard genetic code, further nucleic acid sequences encoding the polypeptides may readily be conceived and manufactured by the skilled person, in addition to those disclosed herein. The nucleic acid sequence may be DNA or RNA, and where it is a DNA molecule, it may for example comprise a cDNA or genomic DNA. The nucleic acid may be contained within an expression vector, as described elsewhere herein.

Embodiments of the invention, therefore, encompass variant nucleic acid sequences encoding the polypeptides contemplated by embodiments of the invention. The term "variant" in relation to a nucleic acid sequence means any substitution of, variation of, modification of, replacement of, deletion of, or addition of one or more nucleotide(s) from or to a polynucleotide sequence, providing the resultant polypeptide sequence encoded by the polynucleotide exhibits at least the same or similar enzymatic properties as the polypeptide encoded by the basic sequence. The term includes allelic variants and also includes a polynucleotide (a "probe sequence") which substantially hybridizes to the polynucleotide sequence of embodiments of the present invention. Such hybridization may occur at or between low and high stringency conditions. In general terms, low stringency conditions can be defined as hybridization in which the washing step takes place in a 0.330-0.825 M NaCl buffer solution at a temperature of about 40-48° C. below the calculated or actual melting temperature (Tm) of the probe sequence (for example, about ambient laboratory temperature to about 55° C.), while high stringency conditions involve a wash in a 0.0165-0.0330 M NaCl buffer solution at a temperature of about 5-10° C. below the calculated or actual Tm of the probe sequence (for example, about 65° C.). The buffer solution may, for example, be SSC buffer (0.15M NaCl and 0.015M tri-sodium citrate), with the low stringency wash taking place in 3×SSC buffer and the high stringency wash taking place in 0.1×SSC buffer. Steps involved in hybridization of nucleic acid sequences have been described for example in Molecular Cloning, a laboratory manual [second edition] Sambrook et al. Cold Spring Harbor Laboratory, 1989, for example in Section 11 "Synthetic Oligonucleotide Probes" thereof (herein incorporated by reference)

Preferably, nucleic acid sequence variants have about 55% or more of the nucleotides in common with the nucleic acid sequence of embodiments of the present invention, more preferably at least 60%, 65%, 70%, 80%, 85%, or even 90%, 95%, 98% or 99% or greater sequence identity.

Variant nucleic acids of the invention may be codon-optimized for expression in a particular host cell.

As used herein, "sequence identity" refers to sequence similarity between two nucleotide sequences or two peptide or protein sequences. The similarity is determined by sequence alignment to determine the structural and/or functional relationships between the sequences.

Sequence identity between amino acid sequences can be determined by comparing an alignment of the sequences using the Needleman-Wunsch Global Sequence Alignment Tool available from the National Center for Biotechnology Information (NCBI), Bethesda, Md., USA, for example via Basic Local Alignment Search Tool, using default parameter settings (for protein alignment, Gap costs Existence: 11 Extension: 1). Sequence comparisons and percentage identities mentioned in this specification have been determined using this software. When comparing the level of sequence identity to, for example, SEQ ID NO:1, this, preferably should be done relative to the whole length of SEQ ID NO:1 (i.e., a global alignment method is used), to avoid short regions of high identity overlap resulting in a high overall assessment of identity. For example, a short polypeptide fragment having, for example, five amino acids might have a 100% identical sequence to a five amino acid region within the whole of SEQ ID NO: 1, but this does not provide a 100% amino acid identity unless the fragment forms part of a longer sequence which also has identical amino acids at other positions equivalent to positions in SEQ ID NO:1. When an equivalent position in the compared sequences is occupied by the same amino acid, then the molecules are identical at that position. Scoring an alignment as a percentage of identity is a function of the number of identical amino acids at positions shared by the compared sequences. When comparing sequences, optimal alignments may require gaps to be introduced into one or more of the sequences, to take into consideration possible insertions and deletions in the sequences. Sequence comparison methods may employ gap penalties so that, for the same number of identical molecules in sequences being compared, a sequence alignment with as few gaps as possible, reflecting higher relatedness between the two compared sequences, will achieve a higher score than one with many gaps. Calculation of maximum percent identity involves the production of an optimal alignment, taking into consideration gap penalties. As mentioned above, the percentage sequence identity may be determined using the Needleman-Wunsch Global Sequence Alignment tool, using default parameter settings. The Needleman-Wunsch algorithm was published in J. Mol. Biol. (1970) vol. 48:443-53.

An aspect of the embodiments relates to a fungal cell. According to the embodiments, the fungal cell lacks a gene encoding Tda3p or comprises a disrupted endogenous gene encoding Tda3p. The fungal cell also comprises a gene encoding a recombinant protein.

The present embodiments are based on engineering of intracellular trafficking as a means of increasing recombinant protein production in fungal cells. We surprisingly found that by disrupting the transport between the Golgi and the endosome, specifically by disrupting the protein Tda3p, optionally in combination with other targets, such as Gos1p, it was possible to increase recombinant protein production and secretion several fold in the fungal cell.

Preferred features of each aspect of the invention may be as described in connection with any of the other aspects.

Other features of the present invention will become apparent from the following examples. Generally speaking, the invention extends to any novel one, or any novel combination, of the features disclosed in this specification (including the accompanying claims and drawings). Thus, features, integers, characteristics, compounds or chemical moieties described in conjunction with a particular aspect, embodiment or example of the invention are to be understood to be applicable to any other aspect, embodiment or example described herein, unless incompatible therewith.

Moreover, unless stated otherwise, any feature disclosed herein may be replaced by an alternative feature serving the same or a similar purpose.

In the following, various embodiments of the present invention will be described in more detail.

Preferably, the fungal cell to be modified can be selected from any known genus and species of fungus. In one embodiment, the fungal cell is selected from a group consisting of *Saccharomyces, Kluyveromyces, Zygosaccharomyces, Candida, Hansenula, Torulopsis, Kloeckera, Pichia, Schizosaccharomyces, Trigonopsis, Brettanomyces, Debaromyces, Nadsonia, Lipomyces, Cryptococcus, Aureobasidium, Trichosporon, Lipomyces, Rhodotorula, Yarrowia, Rhodosporidium, Phaffia, Schwanniomyces, Aspergillus*, and *Ashbya, Saccharomyces cerevisiae* is commonly used yeast in industrial processes, but the disclosure is not limited thereto. Other yeast species useful in the present disclosure include but are not limited to *Pichia pastoris, Ashbya gossypii, Saccharomyces boulardii, Zygosaccharomyces bailii, Kluyveromyces lactis, Rhodosporidium toruloides* and *Yarrowia lipolytica*.

In some embodiments, the transport between the Golgi and the endosome is disrupted in the fungal cell. The modification(s) allow(s) for increased production and/or secretion of recombinant proteins in the fungal cell. This can be achieved by downregulation of proteins involved in the transport between the Golgi and the endosome. For example, in *S. cerevisiae*, this includes the proteins Tda3p, Gos1p, Vps5p, Vps17p, Vps10p, Ccz1p, Hse1p, Pep8p, Vps29p, Vps35p, Snx41p, Btn2p, Dop1p, Trs130p, Trs120p, Snx4p, Fab1p, Ypt7p, Ent5p, Vps53p, Laa1p, Atg20p, Vps52p, Sft1p, Sft2p, Vps51p, Ent3p, Snx3p, Ypt31p, Vps54p, Ypt32p, Ykt6p Mvp1p, Tlg1p, Trs65p, Tca17p, Rcy1p, Ypt6p, Vti1p, Rgp1p, Ric1p, Got1p, Rhb1p, Gga1p, Gga2p, Mon2p, Vta1p and Vps45p. These proteins are encoded by the genes TDA3, GOS1, VPS5, VPS17, VPS10, CCZ1, HSE1, PEP8, VPS29, VPS35, SNX41, BTN2, DOP1, TRS130, TRS120, SNX4, FAB1, YPT7, ENT5, YKR078W, VPS53, LAA1, ATG20, VPS52, SFT1, SFT2, VPS51, ENT3, SNX3, YPT31, VPS54, YPT32, YKT6, MVP1, TLG1, TLG2, TRS65, TCA17, RCY1, YPT6, VTI1, RGP1, RIC1, GOT1, RHB, GGA1, GGA2, MON2, VTA1 and VPS45, respectively.

In a preferred embodiment, the modifications to the transport between the Golgi and the endosome involve disruption of Tda3p (SEQ ID NO: 1). This could be achieved by deleting the endogenous gene coding for this protein. For example, the endogenous TDA3 gene encoding Tda3p could be deleted in S. cerevisiae. Thus, the fungal cell preferably lacks a gene encoding Tda3p or comprises a disrupted endogenous gene encoding Tda3p.

In another embodiment, the modifications to the transport between the Golgi and the endosome involve disruption of Gos1p (SEQ ID NO: 2). This could be achieved by deleting the endogenous gene coding for this protein. For example, the endogenous GOS1 gene encoding Gos1p could be deleted in S. cerevisiae.

Thus, another aspect of the embodiments relates to a fungal cell. According to the embodiments, the fungal cell lacks a gene encoding Gos1p or comprises a disrupted endogenous gene encoding Gos1p. The fungal cell also comprises a gene encoding a recombinant protein.

Hence, in an embodiment, the fungal cell lacks a gene encoding Gos1p or comprises a disrupted endogenous gene encoding Gos1p.

The two aspects described above can be combined. In such an approach, the fungal cells lacks a gene encoding Tda3p and lacks a gene encoding Gos1p; lacks a gene encoding Tda3p and comprises a disrupted endogenous gene encoding Gos1p; lacks a gene encoding Gos1p and comprises a disrupted endogenous gene encoding Tda3p; or comprises a disrupted endogenous gene encoding Tda3p and comprises a disrupted endogenous gene encoding Gos1p. The fungal cell also comprises a gene encoding a recombinant protein.

In an embodiment, any of the modifications above or below are combined with downregulation of proteins that form the retromer complex for transport from endosome to Golgi. This could be achieved by disrupting some of the proteins that make up this complex, such as Vps5p (SEQ ID NO:3), Vps17p (SEQ ID NO:4), Pep8p (SEQ ID NO:5), Vps29p (SEQ ID NO:6) and/or Vps35p (SEQ ID NO:7). For example, the endogenous genes VPS5, VPS17, PEP8, VPS29 and/or VPS35 that make up this complex could be deleted in S. cerevisiae.

Thus, in an embodiment, the fungal cell comprises a disrupted endogenous retromer complex for transport from endosome to Golgi.

In a particular embodiment, the fungal cell is genetically modified for reduced expression of at least one protein selected from a group consisting of Vps5p (SEQ ID NO:3), Vps17p (SEQ ID NO:4), Pep8p (SEQ ID NO:5), Vps29p (SEQ ID NO:6), Vps35p (SEQ ID NO:7), and variants thereof having at least 50% homology to any of SEQ ID NO:3-7).

In another embodiment, recombinant protein production in a fungal cell could be further increased by combining any modifications above or below with disruption in proteins that act as subunits of the HDA1 histone deacetylase complex. Deletion of such subunits increases protein production. Disruption of the HDA1 histone deacetylase complex could be achieved, for example, by disrupting the proteins that make up this complex, such as Hda2p (SEQ ID NO:8) and/or Hda3p (SEQ ID NO:9). This could be achieved by deleting the endogenous HDA2 and/or HDA3 genes encoding subunits of the HDA1 histone deacetylase complex in S. cerevisiae.

Thus, in an embodiment, the fungal cell lacks genes encoding subunits of HDA1 histone deacetylase complex, preferably at least one of Hda2p and Hda3p, or comprises disrupted endogenous genes encoding the subunits of HDA1 histone deacetylase complex, preferably at least one of Hda2p and Hda3p.

In another embodiment, recombinant protein production in a fungal cell could be increased by disruption of Pgm2p (SEQ ID NO: 10), encoding phosphoglucomutase, also referred to as phosphoglucomutase (alpha-D-glucose-1,6-bisphosphate-dependent) (EC 5.4.2.2). This can be achieved, for example, by deleting the endogenous gene encoding phosphoglucomutase. For example, the genes PGM2 and/or PGM1 could be deleted in S. cerevisiae.

Thus, in an embodiment, the fungal cell lacks genes encoding Pgm2p and/or Pgm1p or comprises a disrupted endogenous gene encoding Pgm2p and/or Pgm1p.

In another embodiment, recombinant protein production in a fungal cell could be increased by disruption of subunits of peroxisomal ABC transport complex. This can be achieved, for example, by deleting the endogenous genes encoding subunits of peroxisomal ABC transport complex, such as Pxa1p (SEQ ID NO:11) and/or Pxa2p (SEQ ID NO:12). For example, the gene PXA1 and/or PXA2 could be deleted in S. cerevisiae.

Thus, in an embodiment, the fungal cell lacks genes encoding subunits of peroxisomal ABC transport complex, preferably at least one of Pxa1p and Pxa2p, or comprises disrupted endogenous genes encoding the subunits of peroxisomal ABC transport complex, preferably at least one of Pxa1P and Pxa2p.

In another embodiment, recombinant protein production in a fungal cell could be increased by disruption of members of the conserved endoplasmic reticulum membrane complex. For example, Emc1p (SEQ ID NO:13) could be disrupted. This can be achieved, for example, by deletion of the endogenous EMC1 gene in S. cerevisiae.

Thus, in an embodiment, the fungal cell lacks genes encoding members of the conserved endoplasmic reticulum membrane complex, preferably Emc1p, or comprises disrupted endogenous genes encoding the members of the conserved endoplasmic reticulum membrane complex, preferably Emc1p.

In another embodiment, recombinant protein production in a fungal cell could be increased by disruption of vesicle membrane receptor proteins, for example Snc1p (SEQ ID NO:14) and/or Snc2p (SEQ ID NO:15). This can be achieved, for example, by deletion of the endogenous SNC1 and/or SNC2 gene in S. cerevisiae.

Thus, in an embodiment, the fungal cell lacks genes encoding vesicle membrane receptor proteins, preferably at least one of Snc1p and Snc2p, or comprises disrupted endogenous genes encoding the vesicle membrane receptor proteins, preferably at least one of Snc1p and Snc2p.

In another embodiment recombinant protein production in a fungal cell could be increased by increasing the levels of proteins that act as components of the cytosolic tethering complex, such as Cog1p, Cog2p, Cog3p, Cog4p, Cog5p, Cog6p, Cog7p and/or Cog8p. This can be achieved through overexpression of the endogenous genes encoding these proteins. For example, in a preferred embodiment, the endogenous Cog5p (SEQ ID NO:16) protein is overexpressed in S. cerevisiae.

Thus, in an embodiment, the fungal cell is genetically modified for enhanced expression of at least one component of the cytosolic tethering complex, preferably the at least one component is selected from a group consisting of Cog1p, Cog2p, Cog3p, Cog4p, Cog5p, Cog6p, Cog7p and Cog8p.

In another embodiment, recombinant protein production in a fungal cell could be increased by combining any of the modifications described above or below with increases in the activities of chaperone proteins. This can be achieved by overexpression of proteins that act as chaperones. For example, the activity of the enzyme protein disulfide isomerase (PDI) (EC 5.3.4.1) could be increased by overexpression of the endogenous PDI1 gene (SEQ ID NO:17) in S. cerevisiae. This includes PDI yeast homologs, such as PDI1, MPD1, MPD2, EUG1, and EPS1. Alternatively, or in addition, other chaperones could be overexpressed. For example, Binding immunoglobulin protein (BiP), encoded by KAR2 in S. cerevisiae, the thiol oxidase ERO1, encoded by ERO1, the Sm-like proteins SEC1 or SLY1, encoded by SEC1 and SLY1 could be overexpressed. Chaperones from other species could also, or alternatively, be introduced. For example, the mammalian co-chaperone GRP170 and the peptidyl-prolyl isomerase FKBP2 could be overexpressed in S. cerevisiae. Other genes that could be introduced into a fungal cell to further improve protein production include Dsbc and FkpA from Escherichia coli and S. cerevisiae peptidyl-prolyl cis-trans isomerase (encoded by CPR5).

In an embodiment, the fungal cell is genetically modified for enhanced expression of at least one endogenous chaperone protein, preferably the at least one endogenous protein is selected from a group consisting of Pdl1p, Mpd1p, Mpd2p, Eug1p, Eps1p, Kar2p, Ero1p, Sec1p, Sly1p and Cpr5p.

In an embodiment, the fungal cell comprises at least one heterologous gene encoding a respective heterologous chaperone protein, preferably the respective heterologous chaperone is selected from a group consisting of mammalian GRP170, mammalian FKBP2, Escherichia coli Dsbc and E. coli FkpA.

In another embodiment, the activity of transcription factors that control the expression of protein chaperones could be increased in order to further increase recombinant protein production. For example, the activity of the transcription factor heat shock factor (HSF) could be increased by overexpression of the endogenous gene encoding HSF, such as HSF1 (SEQ ID NO:18) in S. cerevisiae. In addition, in another embodiment, a mutant version of HSF1 is expressed. For example, HSF1 from S. cerevisiae where arginine 206 is replaced, preferably by Serine (R206S), could be overexpressed in a fungal cell.

In an additional embodiment, the activity of the transcription factor Hac1p (SEQ ID NO:19) is increased to activate the unfolded protein response to further facilitate protein folding and production. The activity of the transcription factor Hac1p could be increased by overexpression of the endogenous gene encoding Hac1p, such as HAC1 in S. cerevisiae.

Thus, in an embodiment, the fungal cell is genetically modified for enhanced expression of at least one transcription factor that controls the expression of chaperone proteins, preferably the at least one transcription factor is selected from a group consisting of Hsf1p and Hac1p.

In a further embodiment, the transport between the endoplasmic reticulum (ER) and the Golgi could be increased. This could be achieved, for example, by overexpression of the endogenous proteins involved in ER-Golgi transport, such as Ypt1p, Bos1p, Bet1p, Sec22p, Sed5p, Sar1p, Sec12p, Sec23p, Sec24p, Sec13p, sec14p, Sec15p, Sec16p, Sec17p, Sec18p, Sec19p, Sec20p, Sec21p, Sec22p, Sec25p, Sec26p, Sec27p, Sec28p, Sec29p, Sec30p, Sec31p, Erv14p, Erv26p, Emp24p, Erv25p and/or Erv29p. For example, any of the endogenous genes encoding for these activities, YPT1, BOS1, BET1, SEC22, SED5, SAR1, SEC12, SEC23, SEC24, SEC13, SEC14, SEC15, SEC16, SEC17, SEC18, SEC19, SEC20, SEC21, SEC22, SEC25, SEC26, SEC27, SEC28, SEC29, SEC30, SEC31, ERV14, ERV26, EMP24, ERV25 and ERV29, respectively, could be overexpressed in a S. cerevisiae cell. In a preferred embodiment the overexpressed gene is taken from the group of SEC12, SEC13, SEC16 and ERV25.

Thus, in an embodiment, the fungal cell is genetically modified for overexpression of at least one endogenous protein involved in the transport between the endoplasmic reticulum and the Golgi, preferably the at least one endogenous protein is selected from a group consisting of Ypt1p, Bos1p, Bet1p, Sec22p, Sed5p, Sar1p, Sec12p, Sec23p, Sec24p, Sec13p, sec14p, Sec15p, Sec16p, Sec17p, Sec18p, Sec19p, Sec20p, Sec21p, Sec22p, Sec25p, Sec26p, Sec27p, Sec28p, Sec29p, Sec30p, Sec31p, Erv14p, Erv26p, Emp24p, Erv25p and Erv29p.

In another embodiment recombinant protein production in a fungal cell is increased by combining any of the modifications described above or below with increase in the transport between the Golgi and the plasma membrane (PM). This can be achieved by increasing the levels of the vesicle components involved in Golgi-PM transport. For example, the levels of Sec3p, Sec5p, Sec10p, Sec6p, Sec8p, Exo70p, Exo84p, Sso1p, Sec1p, Ypt32p and/or Sec4p could be increased. This could be achieved by overexpression of any of the endogenous genes encoding these activities. For example, the endogenous genes SEC3, SEC5, SEC10, SEC6, SEC8, EXO70, EXO84, SSO1, SEC1, EXO70, YPT32 and/or SEC4 could be overexpressed in S. cerevisiae.

Thus, in an embodiment, the fungal cell is genetically modified for overexpression of at least one endogenous protein involved in the transport between the Golgi and the plasma membrane, preferably the at least one endogenous protein is selected from a group consisting of Sec3p, Sec5p, Sec10p, Sec6p, Sec8p, Exo70p, Exo84p, Sso1p, Sec1p, Ypt32p and Sec4p.

In some embodiments, the glycosylation of the fungal cell can be modified in order to achieve humanized glycosylation. This can be achieved, for example, by disruption of N-hypermannose glycosylation through disruption of Och1p, Alg3p and/or Mnn9p. For example, the endogenous genes encoding these proteins (OCH1, ALG3, and MNN9, respectively) could be deleted in S. cerevisiae.

In another embodiment, recombinant protein production in a fungal cell could be increased by combining any of the modifications described above or below with deletion in the lipid regulator Opi1p. For example, the endogenous gene encoding OPI1 could be deleted in S. cerevisiae.

In another embodiment, recombinant protein production in a fungal cell could be increased by combining any of the modifications described above or below with deletion of proteases in order to prevent proteolytic degradation of the target protein. This could include vacuolar proteases. For example, the vacuolar proteases Pep4p and/or Prb1p could be deleted. This could be achieve by deleting the endogenous genes PEP4 and/or PRB1 in S. cerevisiae. Alternatively, or in addition, yapsin proteases, which are a family of aspartic proteases located at cell surface could also be disrupted. For example, the yapsin proteases Yps1p, Yps2p, Yps3p, Yps5p, Yps6p and/or Yps7p could be downregulated. This could be achieved by deletion of the endogenous genes YPS1, YPS2, YPS3, YPS5, YPS6 and/or YPS7 in *S. cerevisiae*.

Thus, in an embodiment, the fungal cell lacks genes encoding proteases or comprises disrupted genes encoding endogenous proteases, preferably selected from a group consisting of Pep4p, Prb1p, Yps1p, Yps2p, Yps3p, Yps5p, Yps6p and Yps7p.

In a further embodiment, degradation of non-native proteins can be reduced by deletion or downregulation of the HTM1 gene in *S. cerevisiae*, coding for an alpha-1,2-specific exomannosidase.

In another embodiment, recombinant protein production in a fungal cell could be increased by combining any of the modifications described above or below with increasing the levels of co-translational translocation components. This can be achieved, for example, by overexpression of the endogenous SRP components, such as Srp14p, Srp21p, Srp68p, Srp72p, Sec65p and/or Srp54p. For example, the endogenous genes SRP14, SRP21, SRP68, SRP72, SEC65 and/or SRP54 could be overexpressed in *S. cerevisiae*.

Thus, in an embodiment, the fungal cell is genetically modified for overexpression of at least one endogenous co-translational translocation protein, preferably selected from a group consisting of Srp14p, Srp21p, Srp68p, Srp72p, Sec65p and Srp54p.

In another embodiment, recombinant protein production in a fungal cell could be increased by combining any of the modifications described above or below with modifications in hypoxic gene expression. For example, the endogenous protein Rox1p could be disrupted by deletion of the ROX1 gene (a Heme-dependent repressor of hypoxic genes) in *S. cerevisiae*. Alternatively, activity of the transcription factor Upc2p could be increased. For example, the UPC2-1 allele, which has a G888D mutation in the C-terminus and as a result constitutively activates ergosterol biosynthesis could be overexpressed in *S. cerevisiae*.

In another embodiment, recombinant protein production in a fungal cell could be increased by combining any of the modifications described above or below with reduced endocytosis. This can be achieved by disrupting the endogenous proteins associated with endocytosis, such as Rvs161p and End3p. For example, the endogenous RVS161 and END3 genes could be downregulated in *S. cerevisiae*.

In another embodiment, recombinant protein production in a fungal cell could be increased by combining any of the modifications described above or below with disruption in vacuolar sorting. This could be achieved by disruption of genes involved in vacuolar sorting. For example, Vps30p, Rgp1p, Mrl1p, Vam3p, Vps2p, Vps3p, Vps4p, Vps11p, Vps13p, Vps16p, Vps18p, Vps20p, Vps22p, Vps23p, Vps24p, Vps25p, Vps27p, Vps28p, Vps31p, Vps32p, Vps33p, Vps36p, Vps37p, Vps39p, Vps41p, Vps43p, Vps44p and/or Vps46p.

Thus, in an embodiment, the fungal cell is genetically modified for downregulation of at least one protein involved in vacuolar sorting, preferably selected from a group consisting of Vps30p, Rgp1p, Mrl1p, Vam3p, Vps2p, Vps3p, Vps4p, Vps11p, Vps13p, Vps16p, Vps18p, Vps20p, Vps22p, Vps23p, Vps24p, Vps25p, Vps27p, Vps28p, Vps31p, Vps32p, Vps33p, Vps36p, Vps37p, Vps39p, Vps41p, Vps43p, Vps44p and Vps46p.

In an embodiment, the fungal cell lacks the gene encoding Tda3p or comprises a disrupted endogenous gene encoding Tda3p. The fungal cell is also genetically modified for reduced expression of Vps5p, such as lacks the gene encoding Vps5p or comprises a disrupted endogenous gene encoding Vps5p. The fungal cell further lacks a gene encoding Hda2p or comprises a disrupted endogenous gene encoding Hda2p.

In an embodiment, the fungal cell comprises a heterologous gene encoding the recombinant protein.

The above described embodiments may be combined.

Another aspect of the embodiments relates to a method for producing a recombinant protein. The method comprises culturing a fungal cell according to any of the embodiments in a culture medium and in culture conditions suitable for production of the recombinant protein by the fungal cell. The method also comprises collecting the recombinant protein from the culture medium and/or from the fungal cell.

EXAMPLES

Example 1

Effect of Single Deletions on Protein Production in Yeast

In this example the effect of single gene deletions of ECM3, EMC1, ERV29, GOS1, VPS5, TDA3, COG5, SNC2, HDA2, HDA3, TAN1, PGM2 and PXA1 on recombinant protein production and secretion was examined in a BY4742 *S. cerevisiae* strain.

These single gene deletion strains were purchased from the EUROSCARF and transformed with the α-amylase expression plasmid p426GPD-Amylase. Single gene deletion strains of BY4742 harboring plasmid p426GPD-Amylase were selected on SD-ura plates and then cultured in SD-2×SCAA medium for α-amylase production.

For protein production in tubes or shake flasks, yeast strains were cultured at 30° C. and 200 rpm for 96 hours in the SD-2×SCAA medium[2] containing 20 g/L glucose, 6.9 g/L yeast nitrogen base without amino acids, 190 mg/L Arg, 400 mg/L Asp, 1260 mg/L Glu, 130 mg/L Gly, 140 mg/L His, 290 mg/L Ile, 400 mg/L Leu, 440 mg/L Lys, 108 mg/L Met, 200 mg/L Phe, 220 mg/L Thr, 40 mg/L Trp, 52 mg/L Tyr, 380 mg/L Val, 1 g/L BSA, 5.4 g/L $Na_2HPO_4$, and 8.56 g/L $NaH_2PO_4 \cdot H_2O$ (pH=6.0 by NaOH).

The α-amylase activity in culture supernatant was measured using the α-amylase assay kit (Megazyme K-CERA, Ireland) and a commercial α-amylase from *Aspergillus oryzae* (Sigma, USA) was used as a standard. The weight of α-amylase can be calculated with 69.6 U/mg as α-amylase conversion coefficient according to Liu et al (Biotechnol Bioeng. 2012 May; 109(5):1259-68. doi:10.1002/bit.24409). For intracellular α-amylase measurements, cell pellet was collected from 0.5 ml cell cultures by centrifugation at 12000×g for 3 min. The cell pellet was washed with distilled water and resuspended in 0.5 ml PBS buffer containing 5 µl halt protease inhibitor cocktail (Thermo Fisher, USA). The cell suspension was added to a lysing matrix tube and cell lysis was processed in a FastPrep-24 tissue and cell homogenizer (MP Biomedicals, USA) at a speed of 6.5 m/s for 2 min. Cell debris was removed by centrifugation and the supernatant fraction was used for α-amylase quantification.

Figure 2:
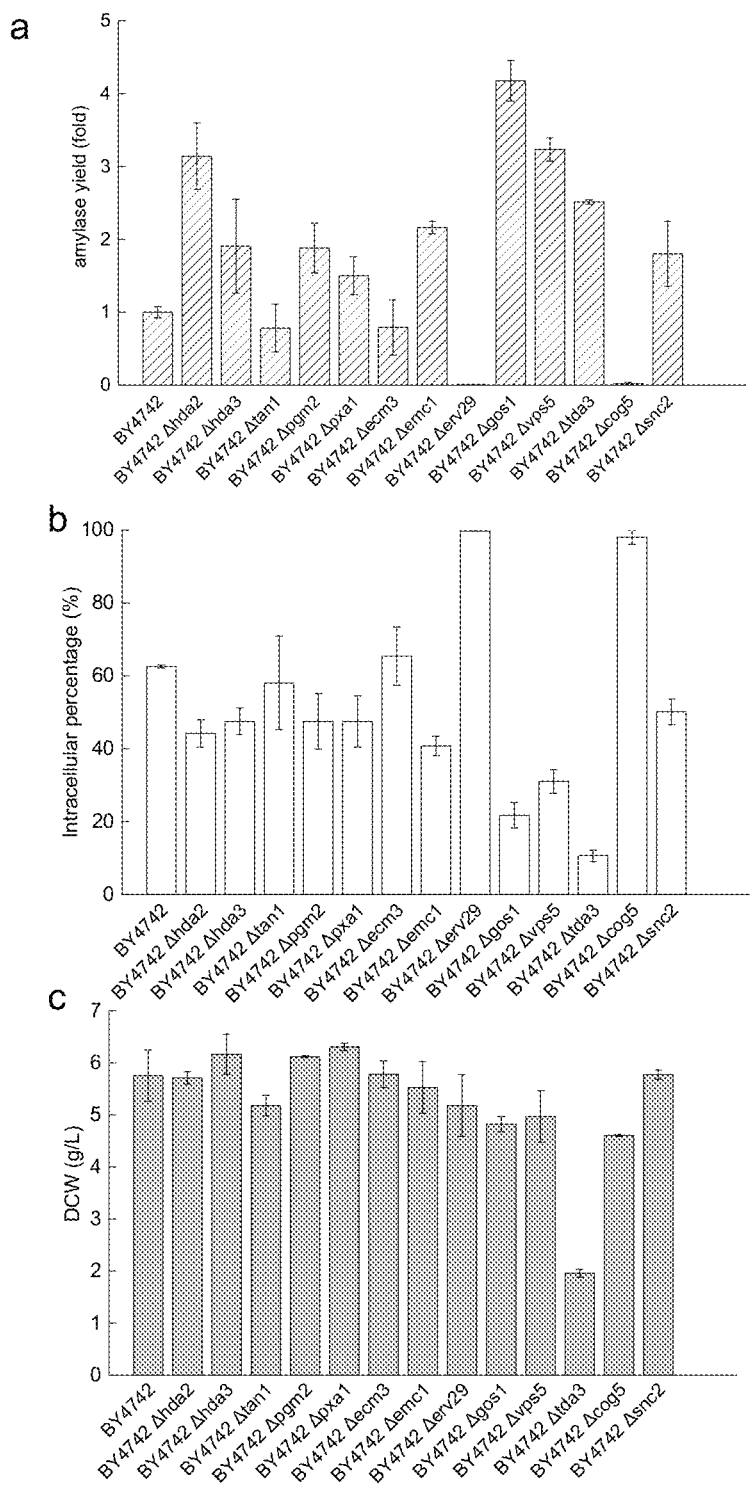
FIG. 2: Disruption of selected genes, especially HDA2, HDA3, PGM2, PXA1, EMC1, GOS1, VPS5, TDA3 or SNC2 in the yeast Saccharomyces cerevisiae leads to increase in recombinant protein production. a) Recombinant protein yield. b) Intracellular percentage—the fraction of the protein that is retained in the cell c) Dry cell weight. α-amylase was used as a model protein in this study.

As shown in FIG. 2, amylase production was improved upon disruption of HDA2, HDA3, PGM2, PXA1, EMC1, GOS1, VPS5, TDA3 and SNC2 (FIG. 2a). Moreover, these modifications were generally associated with a decrease in the intracellular percentage of amylase (FIG. 2b), suggesting increased secretion.

Example 2

Combinatorial Effects of the Gene Deletions

The best four gene targets from Example 1 above (HDA2, VPS5, GOS1 and TDA3) were selected for further studies in CEN.PK strain background.

Figure 3:
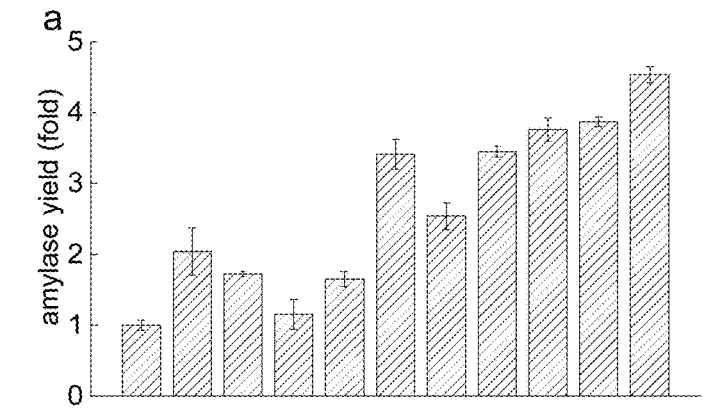
FIG. 3: Combinatorial effect of gene deletions on protein production in yeast. a) Recombinant protein yield. b) Intracellular percentage—the fraction of the protein that is retained in the cell. c) Dry cell weight. α-amylase was used as a model protein in this study.
Figure 3:
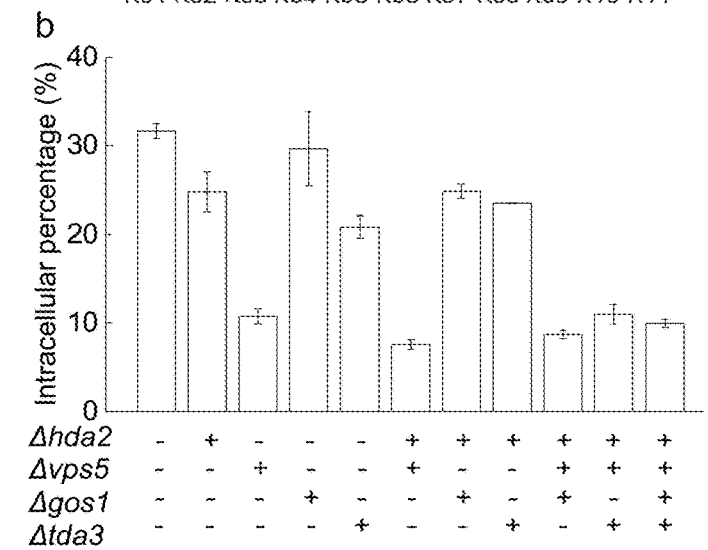
Figure 3:
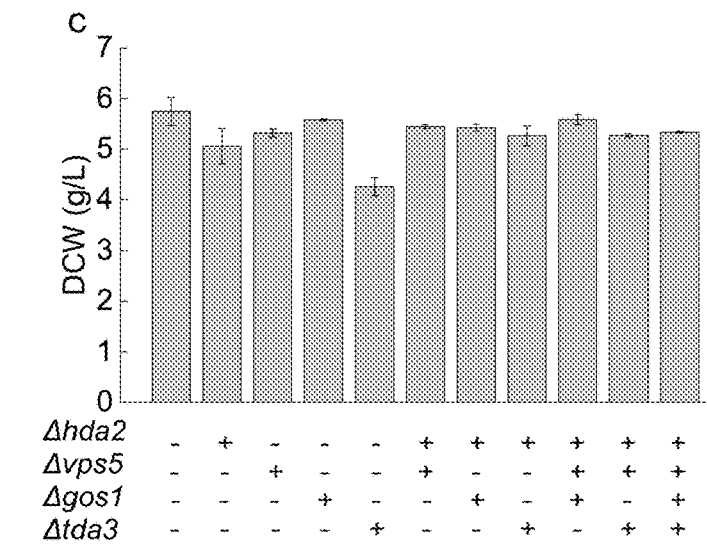
Figure 4:
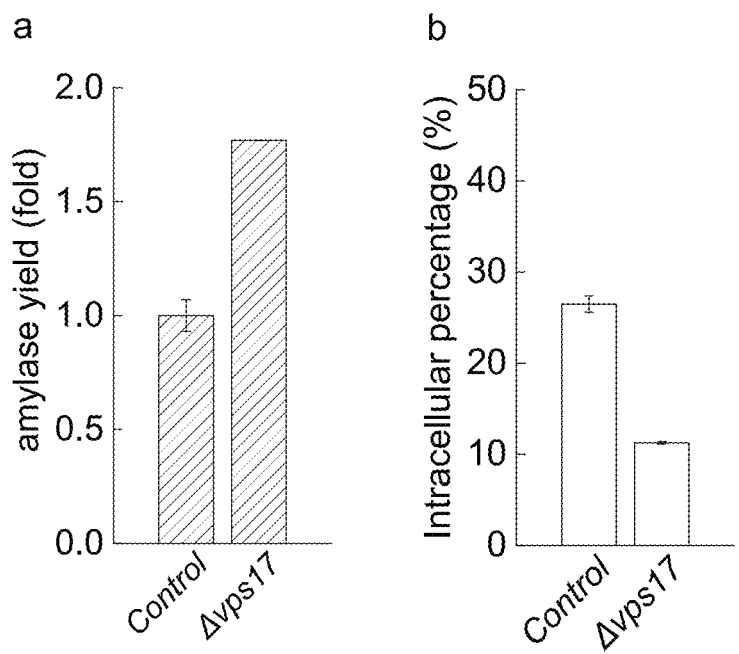
FIG. 4: Disruption of VPS17 increases recombinant protein production a) and decreases intracellular recombinant protein percentage b), suggesting increased secretion. α-amylase was used as a model protein in this study.

Gene deletion in CEN.PK strain was performed by using the amdS gene as selection marker and by following the protocols described by Solis-Escalante et al (FEMS Yeast Res. 2013 February; 13(1):126-39. doi:10.1111/1567-1364.12024). Primer pairs HDA2F and HDA2R and Prime-STAR HS DNA polymerase (Takara, Kyoto, Japan) were used to amplify the HDA2 deletion cassette by using the plasmid pUG-amdSYM as template. The HDA2 deletion cassette was transformed into strain K01 for HDA2 deletion using a standard LiAc/SS DNA/PEG method by Gietz et al (Methods Enzymol. 2002 350, 87-96). Colonies grew on the selective SM-Ac plates were verified for correct hda2 deletion by diagnosis primers HDA2P1 and HDA2P2. As the primer HDA2R contains a homologous sequence to the upstream region of HDA2, the amdS marker can be looped out from the chromosome by homologous recombination. Similarly, VPS5, GOS1 and TDA3 deletion cassettes were amplified from the plasmid pUG-amdSYM by using primer pairs VPS5F/VPS5R, GOS1F/GOS1R and TDA3F/TDA3R, respectively. Deletion of VPS5, GOS1 and TDA3 in CEN.PK strain was carried out by transformation of deletion cassettes and selected on SM-Ac plates. Single gene deletion CEN.PK strains were cultured in SD-2×SCAA medium, and amylase secretion was measured as described in Example 1 above. As shown in FIG. 3, in all cases, single gene deletion increased amylase production and secretion. To further enhance amylase production, combinatorial gene deletions was performed. Combinatorial deletions further increased protein secretion, the triple gene deletions strain K10 (Δhda2, Δvps5 and Δtda3) can secrete 4 fold amylase compared with control strains in tube fermentation. It was noticed that deletion of VPS5 significantly reduced intracellular amylase retention, only 10% of amylase retained in strains with VPS5 deletion. As Vps5p formed a retromer subcomplex with Vps17p, we also tested deletion of VPS17 on amylase secretion. Deletion of VPS17 was performed by transformation of the VPS17 deletion cassette, which was amplified from the plasmid pUG-amdSYM by using primer pairs VPS17F/VPS17R. A similar result of amylase production was obtained in the VPS17 deletion strain, not only amylase yield increased, but also the retention of amylase significantly decreased (FIG. 4). This result emphasized the importance of trafficking between Golgi and endosome in protein secretion.

Example 3

Effect of ERV29 and COG5 Overexpression on Protein Production

The effect of overexpression of ERV29 and COG5 on protein secretion was also tested.

Figure 5:
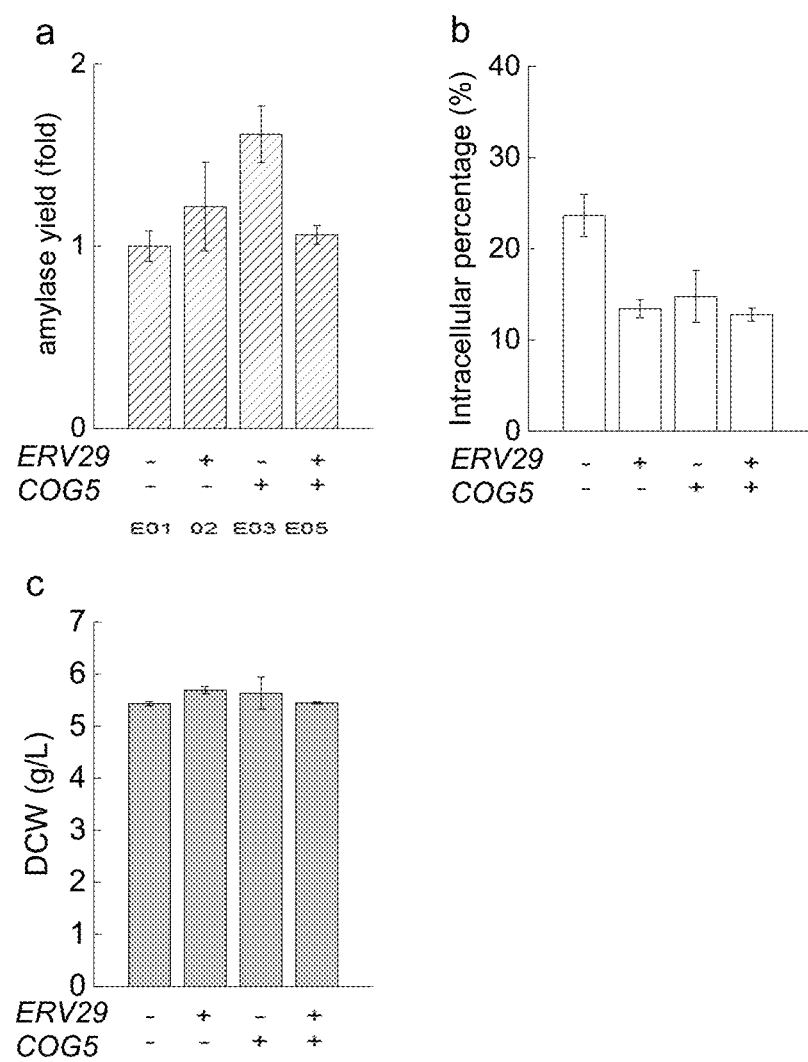
FIG. 5: Effect of ERV29 and/or COG5 overexpression on total protein yield a). intracellular protein percentage b) and dry cell weight c). α-amylase was used as a model protein in this study.

The ERV29 gene fragment was amplified from *S. cerevisiae* CEN.PK 530-1C genome by using primers ERV29EP1 and ERV29EP2, digested with restriction enzymes NotI and SacI, and inserted into the corresponding cloning sites of plasmid pSPGM1, resulting in plasmid pGM-ERV29. The ERV29 gene was under controlled by the promoter TEF1p on the plasmid pGM-ERV29. The COG5 gene fragment was amplified from *S. cerevisiae* CEN.PK 530-1C genome by using primers COG5EP1 and COG5EP2, digested with restriction enzymes BamHI and KpnI, and inserted into the corresponding cloning sites of plasmid pSPGM1, resulting in plasmid pGM-COG5. The COG5 gene was under controlled by the promoter PGK1p on the plasmid pGM-COG5. Similarly, the COG5 gene fragment was inserted into the BamHI-KpnI cloning sites of pGM-ERV29, resulting in the plasmid pGM-ERV-COG, which simultaneously overexpresses both ERV29 and COG5. Together with plasmid pAlphaAmyCPOT, plasmids pGM-ERV29, pGM-COG5 and pGM-ERV-COG were transformed to strain CEN.PK 530.1D as described in Example 1 above, resulting in strain E02, E03 and E05, respectively. Strain E01 with empty plasmid pSPGM1 was used as the reference strain. All strains were cultivated and analyzed for amylase production as described in Example 1 above. As shown in FIG. 5, single gene overexpression improved amylase secretion and decreased intracellular amylase retention. In contrast, combinatorial overexpression only decreased intracellular amylase retention but no increase in amylase secretion. The reason for no increase amylase secretion in combinatorial overexpression strain was most likely that overexpression of two genes by a high copy number plasmid increased burden of cells and consumed too much resource, which should be used for target protein.

Example 4

Combination of Gene Deletion and Gene Overexpression on Protein Production

To reduce cell burden and increase cell stability, strong promoter replacement was applied for overexpression of target genes. Promoter replacement was performed on the triple gene deletions strain K30 (deletion of HDA2, VPS5 and TDA3). The amdS-TEF1p cassette for replacement of the native ERV29 promoter was constructed as follows. Primers ERVPR1 and amdSR1 were used to amplify amdS marker by using plasmid pUG-amdSYM as template. Primers ERVPR3 and ERVPR4 were used to amplify the TEF1p fragment by using plasmid pGM-ERV29 as template. The amdS marker and TEF1p fragment were fused together by fusion PCR and resulted in amdS-TEF1p cassette. The 5' of amdS-TEF1p cassette is homologous to the upstream of the native ERV29 promoter and the 3' of amdS-TEF1p cassette is homologous to the downstream of the native ERV29 promoter. Replacement of the native ERV29 promoter by the promoter TEF1p was accomplished by transformation of the amdS-TEF1p cassette to strain K30 and selected on SM-Ac plates. Primers ERV29P2 and ERVPR5 were used for verification of ERV29 promoter replacement. Similarly, the amdS-PGK1p cassette for replacement of the native COG5 promoter was constructed by using primer pairs COGPR1/amdSR1 and COGPR3/COGPR4, and plasmid pUG-amdSYM and pGM-COG5 as template, respectively. Replacement of the native COG5 promoter by the promoter PGK1p was accomplished by transformation of the amdS-PGK1p cassette to strain K30 and selected on SM-Ac plates, resulting in strain K13. Primers COG5P2 and COGPR5 were used for verification of COG5 promoter replacement.

We were also interested in whether overexpression of PDI1 is compatible with other gene target modifications and further increases protein production capacity of engineered strains. Therefore, both promoter replacement and gene integration were tested for the PDI1 gene. The native PDI1 promoter was replaced by a strong promoter FBA1p. The amdS-FBA1p cassette for replacement of the native PDI1 promoter was constructed as follows. Primers PDIFPR1 and amdSR1 were used to amplify amdS marker by using plasmid pUG-amdSYM as template. Primers PDIFPR3 and PDIFPR4 were used to amplify the FBA1p fragment by using *S. cerevisiae* CEN.PK 530-1C genome as template. The amdS marker and FBA1p fragment were fused together by fusion PCR and resulted in amdS-FBA1p cassette. As deletion of GOS1 showed positive on protein secretion, the position for integration of one copy of PDI1 gene was chosen in the GOS1 locus. Hence, integration of PDI1 was accomplished with replacement of GOS1. Two different PDI1 integration cassettes were tested. One was under controlled by the PDI1 native promoter PDI1p. Another one was under controlled by the promoter TEF1p. The amdS-PDI1p-PDI1 cassette for integration of PDI1 under control by the promoter PDI1p was constructed as follows. Primers GOSPDI1 and amdSR1 were used to amplified amdS marker by using plasmid pUG-amdSYM as template. Primers GOSPDI3 and GOSPDI4 were used to amplify the PDI1p-PDI1 fragment by using *S. cerevisiae* CEN.PK 530-1C genome as template. The amdS marker and PDI1p-PDI1 fragment were fused together by fusion PCR and resulted in amdS-PDI1p-PDI1 replacement cassette. The amdS-TEF1p-PDI1 cassette was constructed as follows. Primers NGOSPDI1 and amdSR1 were used to amplified amdS marker by using plasmid pUG-amdSYM as template. PDI1 gene fragment was amplified from *S. cerevisiae* CEN.PK 530-1C genome by using primers PDI1EP1 and PDIIEP2. The PDI1 gene fragment was then digested by NotI and SacI to insert after TEF1p on plasmid pSPGM1, resulting in pGM-PDI1. Primers NGOSPDI3 and NGOSPDI4 were used to amplify the TEF1p-PDI1 fragment by using pGM-PDI1 as template. The amdS marker and TEF1p-PDI1 fragment were fused together by fusion PCR and resulted in amdS-TEF1p-PDI1 replacement cassette. The amdS-FBA1p, amdS-PDI1p-PDI1 and amdS-TEF1p-PDI1 cassettes were transformed to yeast strain K40 for PDI1 promoter replacement or PDI1 integration, resulted in strain K15, K16 and K17, respectively. All transportations, cultivations and amylase measurements were carried out as described in Example1.

Figure 6:
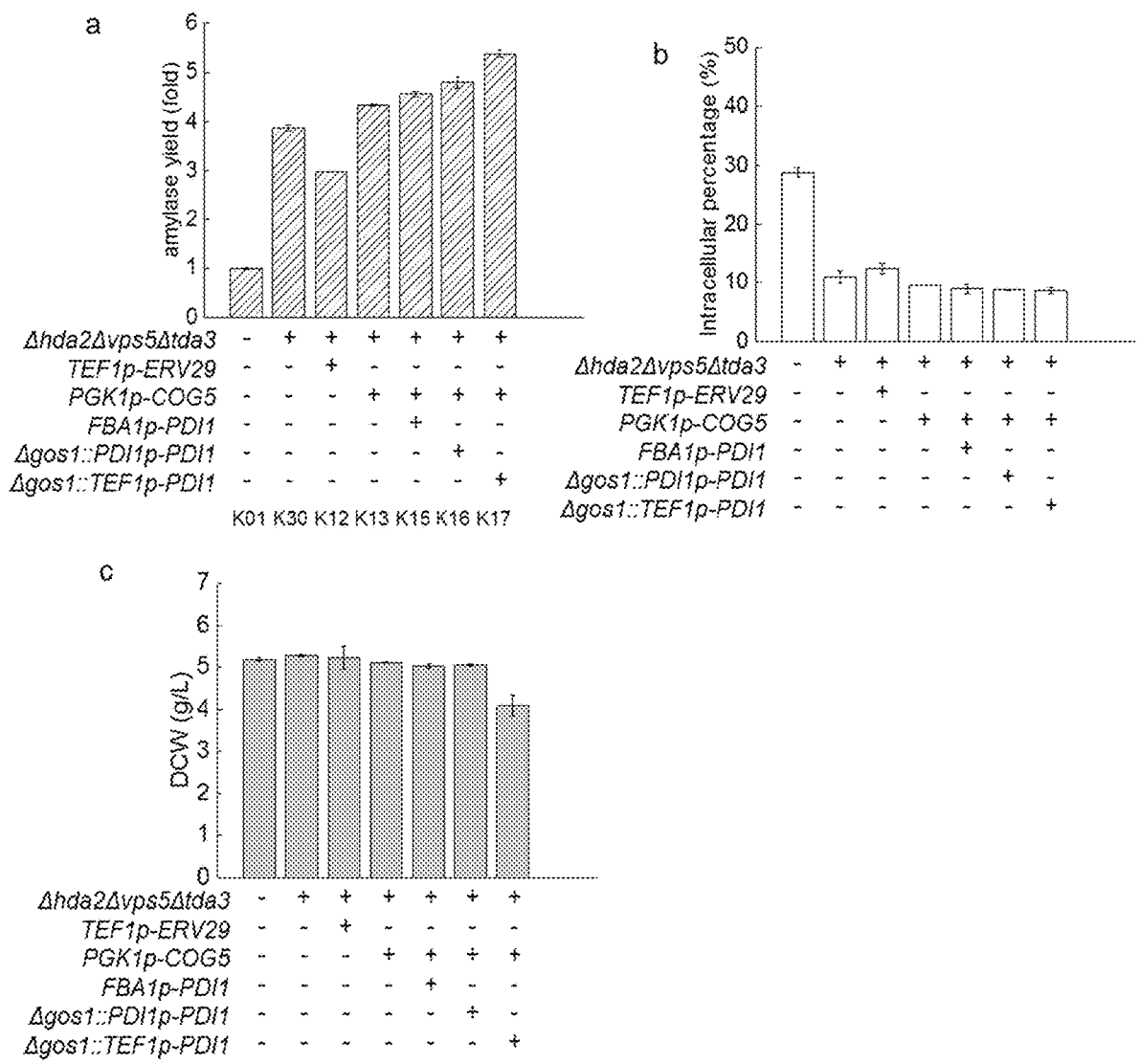
FIG. 6: Combination of selected gene disruption and overexpression increases protein production. a) Total protein yield. b) Intracellular protein percentage. c) Dry cell weight. α-amylase was used as a model protein in this study. The figure shows that combination of deletions of HDA2, VPS5, GOS1 and TDA3 with overexpression of COG5 and PDI1 results in increased α-amylase protein production and decreased intracellular α-amylase percentage, suggesting increased secretion.

As shown in FIG. 6, overexpression of PDI1 was compatible with other gene modifications in yeast strains for enhancement of amylase secretion.

Example 4

Testing of Key Modifications with Other Proteins

In order to demonstrate that the modifications described herein are beneficial for different proteins, the best-producing strain was also tested with glucan 1,4-α-glucosidase instead of amylase. The amylase expression plasmid pAlphaAmyCPOT was eliminated from the best engineered strain K17 by serially transferring into non-selection YPE medium. Strain K17 without plasmid pAlphaAmyCPOT was renamed as CEN.PK 530-1CK303. Another plasmid pCP-aGLA, which expresses the glucan 1,4-α-glucosidase, was transformed into CEN.PK 530-1CK303, and colonies were selected on YPD plates. Then strain CEN.PK 530-1CK303 harboring plasmid pCP-aGLA was cultured in SD-2×SCAA medium and the glucan 1,4-α-glucosidase was measured by using Amyloglucosidase Assay Reagent (Megazyme, Ireland).

Figure 7:
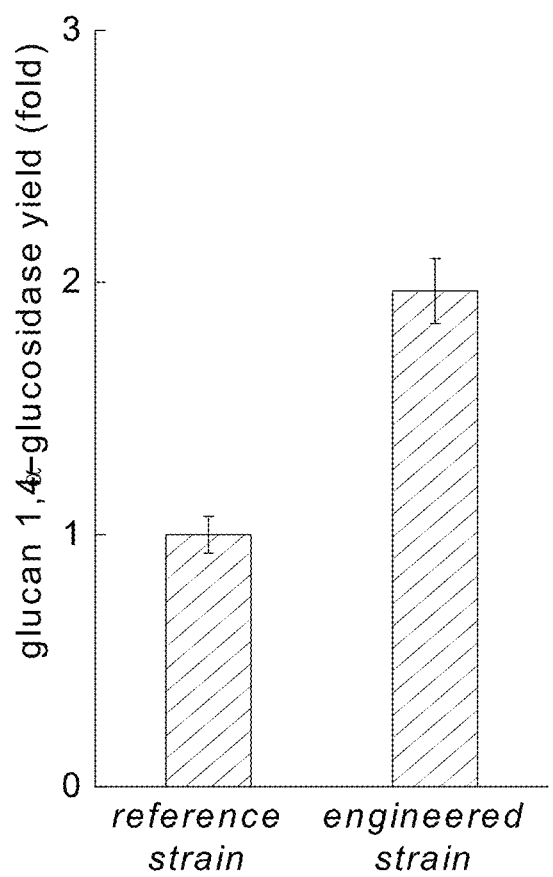
FIG. 7: Combination of selected modifications with additional recombinant proteins. This example shows that the best-producing strain (containing deletions in HDA2, VPS5, GOS1 and TDA3 and overexpression of COG5 and PDI1) can also be used for increased production of glucan 1,4-α-glucosidase.

As shown in FIG. 7, compared with the reference strain, higher glucan 1,4-α-glucosidase yield was achieved by the engineered strain. This result supported that identified gene targets have a general positive effect on protein production, and can be widely used in construction of cell factories for protein production.

Example 5

Fed-Batch Fermentation and Fed-Batch Fermentation

Figure 8:
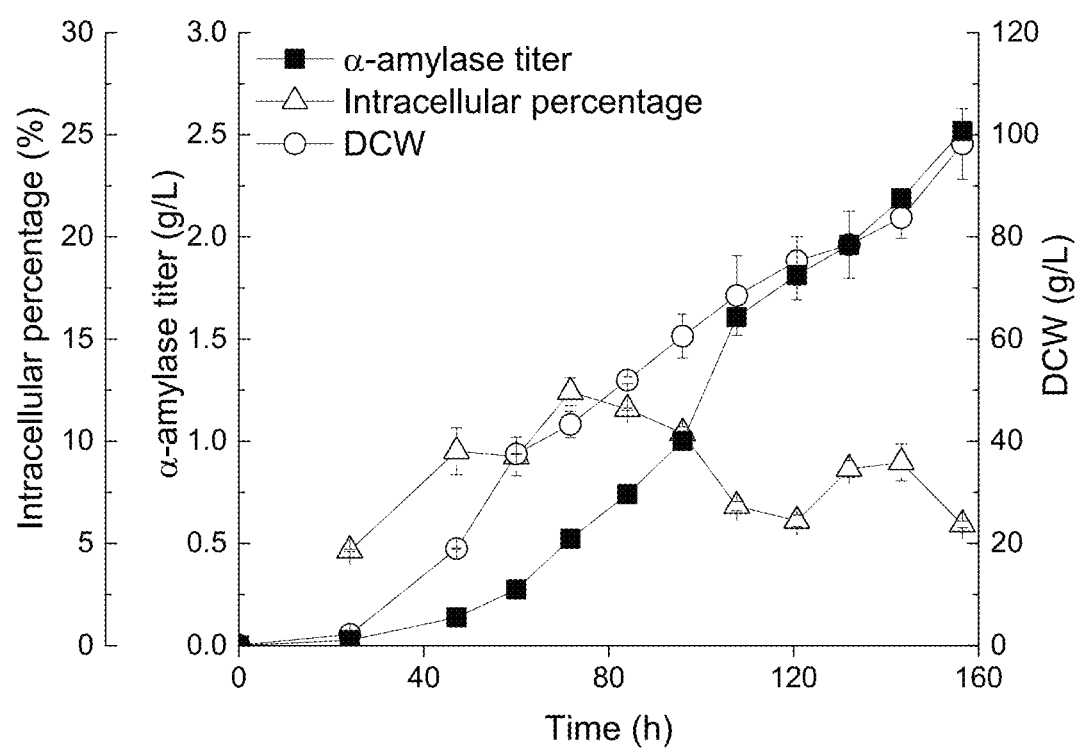
FIG. 8: Fed-batch fermentation of the best-producing strain containing deletions in HDA2, VPS5, GOS1 and TDA3 and overexpression of COG5 and PDI1. α-amylase was used as a model protein in this study.

For the fed-batch cultivation, seed cultures of strain K17 was first inoculated to 200 ml SD-2×SCAA medium (5.4 g/L $Na_2HPO_4$ and 8.56 g/L $NaH_2PO_4 \cdot H_2O$ were replaced by 2 g/L $KH_2PO_4$) with an initial $OD_{600}$ of 0.1. The bioreactor system was run at 30° C., 600 rpm as initial agitation speed and increased to maximally 1200 rpm, 18 L/h as initial air flow and increased to maximally 48 L/h. pH=6 (maintained by using 4 M KOH and 2 M HCl), the dissolved oxygen level was maintained above 30% by controlling agitation speed, air flow and medium feeding. Low glucose 10× feed medium contained: 200 g/L glucose, 69 g/L yeast nitrogen base without amino acids, 50 g/L casamino acids (Formedium, Norfolk, UK), 1 g/L BSA, 20 g/L $KH_2PO_4$ (pH=5 by KOH). For the high glucose 10× feed medium, 200 g/L glucose in low glucose 10× feed medium was replaced by 600 g/L glucose. After the glucose and ethanol were consumed in batch culture (200 ml SD-2×SCAA medium), the exponential feed was started by using the low glucose 10× feed medium and controlled at a specific growth rate of 0.08 $h^{-1}$. When both the agitation speed and the air flow reached maximum value (1200 rpm and 48 L/h, respectively), medium feeding was triggered by dissolved oxygen level >30%. After feeding about 330 ml of low glucose 10× feed medium, high glucose 10× feed medium was used. And fermentation was stopped when 330 ml of high glucose 10× feed medium was fed in the bioreactor. Totally, 660 ml of feeding medium was added to the bioreactor. Biological duplicate experiments were conducted in fed-batch cultivation. As shown in FIG. 8, the final α-amylase titer reached 2.5 g/L, and intracellular α-amylase retention maintained a low level (most of the time below 10% and peak value was 12%) in the whole process.

Both batch and fed-batch cultivation results confirmed that the protein secretion was substantially improved in yeast strain with combinatorial modifications. The engineered strain was able to adapt high density fermentation and showed potential industrial application.

TABLE 1

| Plasmids and strains | | |
|---|---|---|
| Plasmids and strains | Relevant genotype | Reference |
| Plasmids | | |
| CPOTud | 2 μm, AmpR, TPI1p, TPI1t, POT1 gene from *S. pombe* as a selection marker. | Biotechnol. Bioeng. 109, 1259-1268 (2012) |

TABLE 1-continued

Plasmids and strains

| Plasmids and strains | Relevant genotype | Reference |
|---|---|---|
| pAlphaAmyCPOT | CPOTud-(TPI1p-alpha factor leader-amylase gene-TPI1t) | Biotechnol. Bioeng. 109, 1259-1268 (2012) |
| p426GPD | 2 μm, AmpR, URA3, GPDp, CYC1t | Gene 156,119-122 (1995). |
| p426GPD-Amylase | P426GPD-(GPDp-alpha factor leader-amylase gene-CYC1t) | FEMS Yeast Res. 15, fov070 (2015). |
| pSPGM1 | 2 μm, AmpR, URA3, TEF1p, ADH1t, PGK1p, CYC1t | FEMS Yeast Res. 12, 598-607 (2012). |
| pGM-ERV29 | pSPGM1-(TEF1p-ERV29-ADH1t) | This study |
| pGM-COG5 | pSPGM1-(PGK1p-COG5-CYC1t) | This study |
| pGM-ERV-COG | pSPGM1-(TEF1p-ERV29-ADH1t) + (PGK1p-COG5-CYC1t) | This study |
| pGM-PDI1 | pSPGM1-(TEF1p-PDI1-ADH1t) | This study |
| pCP-aGLA | CPOTud-(TPI1p-alpha factor leader-glucan 1,4-a-glucosidase gene-TPI1t) | Proc. Natl Acad. Sci. USA 112, E4689-E4696 (2015). |
| pUG-amdSYM | AmpR, TEF2p-amdS-TEF2t | FEMS Yeast Res. 13, 126-139 (2013). |

Strains

| | | |
|---|---|---|
| BY4742 | MATα his3Δ1 leu2Δ0 lys2Δ0 ura3Δ0 | EUROSCARF |
| BY4742 Δhda2 | BY4742 Δhda2::kanMX4 | EUROSCARF |
| BY4742 Δhda3 | BY4742 Δhda3::kanMX4 | EUROSCARF |
| BY4742 Δtan1 | BY4742 Δtan1::kanMX4 | EUROSCARF |
| BY4742 Δpgm2 | BY4742 Δpgm2::kanMX4 | EUROSCARF |
| BY4742 Δpxa1 | BY4742 Δpxa1::kanMX4 | EUROSCARF |
| BY4742 Δecm3 | BY4742 Δecm3::kanMX4 | EUROSCARF |
| BY4742 Δemc1 | BY4742 Δemc1::kanMX4 | EUROSCARF |
| BY4742 Δerv29 | BY4742 Δerv29::kanMX4 | EUROSCARF |
| BY4742 Δgos1 | BY4742 Δgos1::kanMX4 | EUROSCARF |
| BY4742 Δvps5 | BY4742 Δvps5::kanMX4 | EUROSCARF |
| BY4742 Δtda3 | BY4742 Δtda3::kanMX4 | EUROSCARF |
| BY4742 Δcog5 | BY4742 Δcog5::kanMX4 | EUROSCARF |
| BY4742 Δsnc2 | BY4742 Δsnc2::kanMX4 | EUROSCARF |
| CEN.PK 530-1C | MATa URA3 HIS3 LEU2 TRP1 SUC2 MAL2-8$^c$ tpi1(41-707)::loxP-kanMX-loxP | Biotechnol. Bioeng. 109, 1259-1268 (2012) |
| CEN.PK 530-1CK | MATa URA3 HIS3 LEU2 TRP1 SUC2 MAL2-8$^c$ tpi1(41-707)::loxP | This study |
| CEN.PK 530-1CK303 | CEN.PK 530-1CK Δhda2 Δvps5 Δtda3 PGK1p-COG5 Δgos1::amdSYM-TEF1p-PDI1 | This study |
| CEN.PK 530-1D | MATa HIS3 LEU2 TRP1 SUC2 MAL2-8$^c$ ura3-52 tpi1(41-707)::loxP-KanMX4-loxP | Metab. Eng. 14, 120-127 (2012). |
| K01 | CEN.PK 530-1CK/pAlphaAmyCPOT | This study |
| K02 | CEN.PK 530-1CK Δhda2::amdSYM/ pAlphaAmyCPOT | This study |
| K03 | CEN.PK 530-1CK Δvps5::amdSYM/ pAlphaAmyCPOT | This study |
| K04 | CEN.PK 530-1CK Δgos1::amdSYM/ pAlphaAmyCPOT | This study |
| K05 | CEN.PK 530-1CK Δtda3::amdSYM/ pAlphaAmyCPOT | This study |
| K06 | CEN.PK 530-1CK Δhda2 Δvps5::amdSYM/ pAlphaAmyCPOT | This study |
| K07 | CEN.PK 530-1CK Δhda2 Δgos1::amdSYM/ pAlphaAmyCPOT | This study |
| K08 | CEN.PK 530-1CK Δhda2 Δtda3::amdSYM/ pAlphaAmyCPOT | This study |
| K09 | CEN.PK 530-1CK Δhda2 Δvps5 Δgos1::amdSYM/ pAlphaAmyCPOT | This study |
| K10 | CEN.PK 530-1CK Δhda2 Δvps5 Δtda3::amdSYM/ pAlphaAmyCPOT | This study |
| K30 | CEN.PK 530-1CK Δhda2 Δvps5 Δtda3/ pAlphaAmyCPOT | This study |
| K11 | CEN.PK 530-1CK Δhda2 Δvps5 Δtda3 Δgos1::amdSYM/pAlphaAmyCPOT | This study |
| K12 | CEN.PK 530-1CK Δhda2 Δvps5 Δtda3 amdSYM-TEF1p-ERV29/pAlphaAmyCPOT | This study |
| K13 | CEN.PK 530-1CK Δhda2 Δvps5 Δtda3 amdSYM-PGK1p-COG5/pAlphaAmyCPOT | This study |
| K40 | CEN.PK 530-1CK Δhda2 Δvps5 Δtda3 PGK1p-COG5/ pAlphaAmyCPOT | This study |

TABLE 1-continued

Plasmids and strains

| Plasmids and strains | Relevant genotype | Reference |
|---|---|---|
| K15 | CEN.PK 530-1CK Δhda2 Δvps5 Δtda3 PGK1p-COG5 amdSYM-FBA1p-PDI1/pAlphaAmyCPOT | This study |
| K16 | CEN.PK 530-1CK Δhda2 Δvps5 Δtda3 PGK1p-COG5 Δgos1::amdSYM-PDI1p-PDI1/pAlphaAmyCPOT | This study |
| K17 | CEN.PK 530-1CK Δhda2 Δvps5 Δtda3 PGK1p-COG5 Δgos1::amdSYM-TEF1p-PDI1/pAlphaAmyCPOT | This study |
| E01 | CEN.PK 530-1D/pAlphaAmyCPOT + pSPGMI | This study |
| E02 | CEN.PK 530-1D/pAlphaAmyCPOT + pGM-ERV29 | This study |
| E03 | CEN.PK 530-1D/pAlphaAmyCPOT + pGM-COG5 | This study |
| E05 | CEN.PK 530-1D/pAlphaAmyCPOT + pGM-ERV-COG | This study |
| E13 | CEN.PK 530-1CK/pCP-aGLA | This study |
| E14 | CEN.PK 530-1CK303/pCP-aGLA | This study |

TABLE 2

Primers

| Name | SEQ ID NO | Sequence (5'→3')# |
|---|---|---|
| *Plasmid construction* | | |
| ERV29EP1 | 20 | ACTGCGGCCGCAACAAAATGTCTTACAGAGGACCTATTGGA |
| ERV29EP2 | 21 | CGTGAGCTCCTAGTAAATCTTCTTCTTTTCATCAACGGAT |
| COG5EP1 | 22 | TCAGGATCCAACAAAATGACAATAGCGCCAATGGCAA |
| COG5EP2 | 23 | CCAGGTACCTCACTTATTTAGAGAAATAGATACTGAGTTTAGCAT |
| PDI1EP1 | 24 | ACTGCGGCCGCAACAAAATGAAGTTTTCTGCTGGTGCC |
| PDI1EP2 | 25 | CGTGAGCTCTTACAATTCATCGTGAATGGCATCTTCT |
| *Gene deletion, gene replacement and promoter replacement* | | |
| HDA2F | 26 | ATGAGTAGGAAAAATTCTAAGAAACTAAAAGTCTATTACTTACCT GTAACGCTAACCCAAGACATGGAGGCCCAGA ATAC |
| HDA2R | 27 | AAATCTCTCTATATTATACAGGCTACTTCTTTTAGGAAACGTCAC ATTCATTAGTCGATAGTATTGTATCTATTTTCTTTATTTTTCACAC ACCAGTATAGCGACCAGCATTC |
| VPS5F | 28 | ATGGACTACGAGGATAATCTAGAAGCACCTGTTTGGGACGAACT AAATCATGAGGGAGATAAAGACATGGAGGCCCAGA ATAC |
| VPS5R | 29 | ATAAATCCTGAGGAACGTGACACATAAAGTTATTGTATACAGAT CATCTATTAGGCTTGTTATTGCAGGATGTATGAAAGTTTATAAAA TCCCCAGTATAGCGACCAGCATTC |
| GOS1F | 30 | ATGAGCTCACAACCGTCTTTCGTCACCATAAGGGGCAAGGCCA TTTCTCTAGAAACACAAACGGGACATGGAGGCCCAGA ATAC |
| GOS1R | 31 | AGATTCTTGTTATGTTTTTACATACGTTGTTTAATAAAAGTCGTTA TTTATCAGTGGTGTGGTTGCTTGTCTGGAATTGGGCTTTTCCCTGT GCAGTATAGCGACCAGCATTC |
| TDA3F | 32 | ATGGGTGAAGATTTTATGCACCCACCGTTTCAAACGTACCCTTC AAAGAACAGCGAAGGGAAGACATGGAGGCCCAGA ATAC |
| TDA3R | 33 | CAAATTTGTGCATATACTTTTCTTGACCTTATTACTCCTCGGCTT GATTATCATTATAAACACTATTCCTTCTGTTGCTTGGTTAAAATG CTACAGTATAGCGACCAGCATTC |
| VPS17F | 34 | ATGACTTCGGCTGTACCTTATGATCCATATGATGATCTGGATAA CAATCCATTTGCTGAGCCCCAGGAGGAAGACATGGAGGCCCAG AATAC |
| VPS17R | 35 | AAAGATCACCTTGTTCAAAGGTATGAATTTTCTACTTTATATACG TATTATCATGTTCAGAGGATAGATGGATTGACTAAGGGTACAGT ACGGCAAACAGTATAGCGACCAGCATTC |
| amdSF1 | 36 | GACATG GAGGCCCAGA ATAC |

TABLE 2-continued

Primers

| Name | SEQ ID NO | Sequence (5'→3')# |
|---|---|---|
| amdSR1 | 37 | CAGTATAGCG ACCAGCATTC |
| ERVPR1 | 38 | TTCTAGAAGATGAGAGAAGAGGGAATAATGAGAAAGGCGAAAA ATAAAGGCACACACCATAGCTTCAAAATGTTTCTACTCCTTTTTT ACTCTTCCAGACATGGAGGCCCAGA ATAC |
| ERVPR3 | 39 | AAGTTAAGTGCGCAGAAAGTAATATCATGCGTCAATCGTATGTG AATGCTGGTCGCTATACTGGCACACACCATAGCTTCAAAATGT |
| ERVPR4 | 40 | GACAAACTTGGAATGTAAGGCTTC |
| COGPR1 | 41 | ATTTTTTGTTAGACATATAATTTTATATCATTATTCTTATTATTCTT ATAGGAAGTACCTTCAAAGAATGGGGTCTTATCTTGTTTTGCAA GTACCACGACATGGAGGCCCAGA ATAC |
| COGPR3 | 42 | AAGTTAAGTGCGCAGAAAGTAATATCATGCGTCAATCGTATGTG AATGCTGGTCGCTATACTGGGAAGTACCTTCAAAGAATGGGGTC |
| COGPR4 | 43 | TATCTCCAATGGGTTGCTATTCATC |
| PDIFPR1 | 44 | GCATTTTGTTGTGCTGTTACAACCACAACAAAACGAAAAACCCG TATGGATCCAACTGGCACCGCTGGCTTGAACAACAATACCAGC CTTCCAACTTCGACATGGAGGCCCAGA ATAC |
| PDIFPR3 | 45 | AAGTTAAGTGCGCAGAAAGTAATATCATGCGTCAATCGTATGTG AATGCTGGTCGCTATACTGTCCAACTGGCACCGCTGGCTT |
| PDIFPR4 | 46 | ACAGCCTCTTGTTGGGCGAAAACAGAGGAGGCGAGCAGCAGG GAGGACCATGACAGGACGGCACCAGCAGAAAACTTCATTTTGA ATATGTATTACTTGGTTATGGTTATATATGAC |
| GOSPDI1 | 47 | GTTCAATAGTGTGGTTGGTAACCAAATTTTCTAGGCGTTGTTGA AAATAATCATTAGTGCCCACCGTTTGAGCGTGGTGTGACACCAC GCCCAAGATAGACATGGAGGCCCAGA ATAC |
| GOSPDI3 | 48 | CCCAGATGCGAAGTTAAGTGCGCAGAAAGTAATATCATGCGTCA ATCGTATGTGAATGCTGGTCGCTATACTGTCATTAGTGCCCACC GTTTGAG |
| GOSPDI4 | 49 | ATTACGAAATGGCCTGTATGGGTAGATTCTTGTTATGTTTTTACA TACGTTGTTTAATAAAAGTCGTTATTCAATTACAATTCATCGTGA ATGGCATCT |
| GOSPDI5 | 50 | CCCAGATGCGAAGTTAAGTGC |
| GOSPDI6 | 51 | ATTACGAAATGGCCTGTATGGGTAG |
| NGOSPDI1 | 52 | TACTCTTGTTCAATCAGTTAGTTATCTTTGTTCAATAGTGTGGTT GGTAAGCACACACCATAGCTTCAAAATGTTTCTACTCCTTTTTTA CTCTTCCAGACATGGAGGCCCAGA ATAC |
| NGOSPDI3 | 53 | CCCAGATGCGAAGTTAAGTGCGCAGAAAGTAATATCATGCGTCA ATCGTATGTGAATGCTGGTCGCTATACTGGCACACACCATAGCT TCAAAATGT |
| NGOSPDI4 | 54 | ATTACGAAATGGCCTGTATGGGTAGATTCTTGTTATGTTTTTACA TACGTTGTTTAATAAAAGTCGTTATTCATTACAATTCATCGTGAA TGGCATCTTC |
| Verification primers for gene deletion, gene replacement and promoter replacement | | |
| amdSP1 | 55 | TTACCACGGTGCTCCAGTTG |
| amdSP2 | 56 | AACCAAGTCAGCAGCAGAAG |
| HDA2P1 | 57 | TGCGGCACAGAAGAGTAACC |
| HDA2P2 | 58 | GGCGATAAACGATAGGCAAC |
| VPS5P1 | 59 | TCCGCTAAGAACAACTAAGTGA |
| VPS5P2 | 60 | CACTGGCTGTAAACGGACCTAT |
| GOS1P1 | 61 | TGCAAACCCAGTGTAAGACGC |

TABLE 2-continued

Primers

| Name | SEQ ID NO | Sequence (5'→3')# |
|---|---|---|
| GOS1P2 | 62 | ATATGGTTCGAGAACAGGCATC |
| TDA3P1 | 63 | AGCACGACATAGAAGTGAAACC |
| TDA3P2 | 64 | CGCAAGGGCAAACAGGATAGAC |
| VPS17P1 | 65 | CGATTGAGTCGAACACCCTGA |
| VPS17P2 | 66 | CTTGGGTGCGTAGGTCTGG |
| ERV29P2 | 67 | GTCTTGTAACCAATGGCGAAAC |
| ERVPR5 | 68 | GCCACCACGATTGACGAACA |
| COG5P2 | 69 | TTAACAGCGACTTGCCCACAGG |
| COGPR5 | 70 | AGCTAGTCTGTGACCTGTACG |
| PDIPR5 | 71 | TGCACGTGATAATATGTTACCCTGTC |
| PDIPR6 | 72 | GGAGGAGGATGAGATAAGTAGTTTCC |
| GOS1P5 | 73 | AAAACTCTGGCGGCTAAACTGG |
| GOS1P6 | 74 | CATCAATACTGGCGATAAGCGGGAC |
| PDI7 | 75 | TCCTTGGACTCTTTATTCGACTTCATC |
| PDI8 | 76 | CGCATTATAAGTGGTGTGCCGA |
| PDI10 | 77 | ATGCTGTGCTTGGGTGTTTTGA | underlined sequence indicates restriction site.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A fungal cell, wherein said fungal cell is genetically modified for
   reduced expression of any protein,
   and
   said fungal cell comprises a gene encoding a recombinant protein.

2. The fungal cell according to claim 1, wherein said fungal cell is genetically modified for enhanced expression of at least one endogenous protein selected from a group consisting of Pd1p, Mpd1p, Mpd2p, Eug1p, Eps1p, Kar2p, Ero1p, Sec1p, Sly1p and Cpr5p.

3. The fungal cell according to claim 1, wherein said fungal cell is genetically modified for enhanced expression of at least one transcription factor that controls the expression of chaperone proteins.

4. The fungal cell according to claim 1, wherein said fungal cell is genetically modified for overexpression of at least one endogenous protein involved in the transport between the endoplasmic reticulum and the Golgi.

5. The fungal cell according to claim 1, wherein said fungal cell is genetically modified for overexpression of at least one endogenous protein involved in the transport between the Golgi and the plasma membrane.

6. The fungal cell according to claim 1, wherein said fungal cell lacks genes encoding proteases or comprises disrupted genes encoding endogenous proteases.

7. The fungal cell according to claim 1, wherein said fungal cell is genetically modified for downregulation of at least one protein involved in vacuolar sorting.

8. The fungal cell according to claim 1, wherein said fungal cell comprises a heterologous gene encoding said recombinant protein.

9. The fungal cell according to claim 1, wherein said fungal cell is further genetically modified for reduced expression of Pgm2 and/or Pxa1p.

10. The fungal cell according to claim 1, wherein said fungal cell is further genetically modified for overexpression of Cog1p, Cog2p, Cog3p, Cog4p, Cog5p, Cog6p, Cog7p or Cog8p, or any combination thereof.

11. The fungal cell according to claim 3, wherein the at least one transcription factor is selected from a group consisting of Hsf1p and Hac1p.

12. The fungal cell according to claim 4, wherein the at least one endogenous protein is selected from a group consisting of Ypt1p, Bos1p, Bet1p, Sec22p, Sed5p, Sar1p, Sec12p, Sec23p, Sec24p, Sec13p, sec14p, Sec15p, Sec16p, Sec17p, Sec18p, Sec19p, Sec20p, Sec21p, Sec22p, Sec25p, Sec26p, Sec27p, Sec28p, Sec29p, Sec30p, Sec31p, Erv14p, Erv26p, Emp24p, Erv25p and Erv29p.

13. The fungal cell according to claim 5, wherein the at least one endogenous protein is selected from a group consisting of Sec3p, Sec5p, Sec10p, Sec6p, Sec8p, Exo70p, Exo84p, Sso1p, Sec1p, Ypt32p and Sec4p.

14. The fungal cell according to claim 6, wherein the proteases are selected from a group consisting of Pep4p, Prb1p, Yps1p, Yps2p, Yps3p, Yps5p, Yps6p and Yps7p.

15. The fungal cell according to claim 7, wherein the at least one protein involved in vacuolar sorting is selected from a group consisting of Vps30p, Rgp1p, Mrl1p, Vam3p, Vps2p, Vps3p, Vps4p, Vps11p, Vps13p, Vps16p, Vps18p, Vps20p, Vps22p, Vps23p, Vps24p, Vps25p, Vps27p, Vps28p, Vps31p, Vps32p, Vps33p, Vps36p, Vps37p, Vps39p, Vps41p, Vps43p, Vps44p and Vps46p.

* * * * *

SEQUENCE LISTING

```
Sequence total quantity: 77
SEQ ID NO: 1           moltype = AA  length = 523
FEATURE                Location/Qualifiers
source                 1..523
                       mol_type = protein
                       organism = Saccharomyces cerevisiae
SEQUENCE: 1
MGEDFMHPPF QTYPSKNSEG KKHIVIVGGG IIGCCTAYYL TQHPSFSPST HHITIIESRR   60
IAGGASGKAG GLLASWAFPH QIVPLSFQLH QELSDEYDGE NNWDYRRLTT VSLEADVREE  120
VIENYERLSK KAYNLNVPPP KKRPGYISNK FNIGDSNSSL SSSGSSLKND SASNEEEGSD  180
IHVSSSVPSL HSLTNERMRS HTNSASDLDS VSPVEQLRET NIHNPLPADL DWIRRELVND  240
WSSLGGTDTT AQLHPYKFTH FILSKAMETG AVDLLLGKVV GLKCDEMDCV HSLKYLPSVV  300
KNRRNSRGHA ENPDIKLGTI FNDENAKPIE INDIQQIVLS MGPWTSKILK DCPISGLRAH  360
SVTIKPSEKT VSPYAILAEL KVNDREFFSP EMYARKDEVY VCGEGDTLVN IPESSDDVEV  420
VSEKCDELYH YVSKLSPTLS KGHLLRKQAC FLPVLNVPTS SGPLIGETNV KDLYIASGHS  480
CWGINNAPAT GKLMAEILLD GEATSAEISS LDPKLYFDAT ILS                   523

SEQ ID NO: 2           moltype = AA  length = 223
FEATURE                Location/Qualifiers
source                 1..223
                       mol_type = protein
                       organism = Saccharomyces cerevisiae
SEQUENCE: 2
MSSQPSFVTI RGKAISLETQ TESLLSKYST FAQTTSSEQT GQEKKIDKQL EGILGQRQDV   60
IDSLTQICDS NPAISASKLS QLHRHKEILQ DHWKSFRNIR SSIQQERNRL NLLFSVKNDI  120
```

```
ANSTTDAPAP IGDADEYIQN ETRRIDQSNN VVDRLISQAW ETRSQFHSQS NVLNTANNKV    180
LQTLQRIPGV NQLIMKINTR RKKNAFVLAT ITTLCILFLF FTW                     223

SEQ ID NO: 3              moltype = AA  length = 675
FEATURE                   Location/Qualifiers
source                    1..675
                          mol_type = protein
                          organism = Saccharomyces cerevisiae
SEQUENCE: 3
MDYEDNLEAP VWDELNHEGD KTQSLVSNSI ESIGQISTNE ERKDNELLET TASFADKIDL    60
DSAPEWKDPG LSVAGNPQLE EHDNSKADDL INSLAPEQDP IADLKNSTTQ FIATRESGGA    120
LFTGNANSPL VFDDTIYDAN TSPNTSKSIS GRRSGKPRIL FDSARAQRNS KRNHSLKAKR    180
TTASDDTIKT PFTDPLKKAE KENEFVEEPL DDRNERRENN EGKFTASVEK NILEQVDRPL    240
YNLPQTGANI SSPAEVEENS EKFGKTKIGS KVPPTEKAVA FKVEVKDPVK VGELTSIHVE    300
YTVISESSLL ELKYAQVSRR YRDFRWLYRQ LQNNHWGKVI PPPPEKQSVG SFKENFIENR    360
RFQMESMLKK ICQDPVLQKD KDFLLFLTSD DFSSESKKRA FLTGSGAIND SNDLSEVRIS    420
EIQLLGAEDA AEVLKNGGID AESHKGFMSI SFSSLPKYNE ADEFFIEKKQ KIDELEDNLK    480
KLSKSLEMVD TSRNTLAAST EEFSSMVETL ASLNVSEPNS ELLNNFADVH KSIKSSLERS    540
SLQETLTMGV MLDDYIRSLA SVKAIFNQRS KLGYFLVVIE NDMNKKHSQL GKLGQNIHSE    600
KFREMRKEFQ TLERRYNLTK KQWQAVGDKI KDEFQGFSTD KIREFRNGME ISLEAAIESQ    660
KECIELWETF YQTNL                                                    675

SEQ ID NO: 4              moltype = AA  length = 551
FEATURE                   Location/Qualifiers
source                    1..551
                          mol_type = protein
                          organism = Saccharomyces cerevisiae
SEQUENCE: 4
MTSAVPYDPY DDLDNNPFAE PQEEDSEPAA TTTDGSSSMS EERVGTEQTA ASVQDNGTAN    60
NIQNGLGEEG NATRSKTSNE HNENQQPSQP SERVILPERS DEKKKYTLLA KVTGLERFGS    120
ATGKKENPTI IFDCSTNLPT FRKQQYKNVK KSYEEFHQLF KYLNVAIQES FVPTLPSAYT    180
TFGINSEEDR MKVTRNFQLW FNRLSQDPLI IRNEEVAFFI ESDFNTYTPI NKSKSLASGL    240
KRKTLKQLAP PYDEITELAE FRPLVKSIYV VSQSLQEKLL RVSRNRKMMV QEENAFGQDF    300
VNLDEHNKLY RRYGKILTAV GDIDSIIATM DMATLYDGLE WIVRDAYAVK EALTNRHFIM    360
RNLVQAQQNS KAKQEQARRF RSRRDINPMK IDEALRQLKA AAKNEQVLTL KLQRITSNMI    420
IERKQWISWY EEWIRSSIKE FTLRKIEYER KKLTLLERVR SDIRKADENG GLSRLGRHAV    480
SNNNSDTSQT LKGDSWTGES NRKSQIPINK IAHTEFDDEL FTEDDGYNSQ DSDTTSLNAR    540
HAASLLGMST K                                                        551

SEQ ID NO: 5              moltype = AA  length = 379
FEATURE                   Location/Qualifiers
source                    1..379
                          mol_type = protein
                          organism = Saccharomyces cerevisiae
SEQUENCE: 5
MSIFFKPPID IEILFDNEES RKHVDIATRS SNSSYKSMKE SLPVYEDGES LGGIVTLRVR    60
DSKKVDHLGI KVSVIGSIDM LKSHGSGNSS SKKVTSSTSS SSSNGSVDVR KNSVDQFLCQ    120
SYDLCPAGEL QHSQSFPPLF RDLSKRYESY KGKNVDVAYY VKVTVMRKST DISKIKRFWV    180
YLYNSVTTAP NTLSANETKA TTNDIAGGNY AADNASDNTQ TKSTQGEAAD VNQVLPISHS    240
NNEPKPVRLD IGIENCLHIE FEYAKSQYSL KEVIVGRIYF LLTRLRIKHM ELSLITRESS    300
GLQTSNVMTD STAIRYEIMD GSSVKGETIP IRLFLSGYDL TPNMSCNYFN VKNYLSLVII    360
DEDGRRYFKQ SEITLYRTR                                                379

SEQ ID NO: 6              moltype = AA  length = 282
FEATURE                   Location/Qualifiers
source                    1..282
                          mol_type = protein
                          organism = Saccharomyces cerevisiae
SEQUENCE: 6
MLLLALSDAH IPDRATDLPV KFKKLLSVPD KISQVALLGN STKSYDFLKF VNQISNNITI    60
VRGEFDNGHL PSTKKDKASD NSRPMEEIPM NSIIRQGALK IGCCSGYTVV PKNDPLSLLA    120
LARQLDVDIL LWGGTHNVEA YTLEGKFFVN PGSCTGAFNT DWPIVFDVED SDEAVTSEVD    180
KPTKENQSED DDAKGGSTGK EQPGSYTPKE GTAGERENEN ESNVKPENQF KEDEVDMSDS    240
DINGSNSPSF CLLDIQGNTC TLYIYLYVNG EVKVDKVVYE KE                      282

SEQ ID NO: 7              moltype = AA  length = 944
FEATURE                   Location/Qualifiers
source                    1..944
                          mol_type = protein
                          organism = Saccharomyces cerevisiae
SEQUENCE: 7
MAYADSPENA IAVIKQRTAL MNRCLSQHKL MESLQHTSIM LTELRNPNLS PKKYYELYVI    60
IFDSLTNLST YLIENHPQNH HLADLYELVQ YTGNVVPRLY LMITVGTSYL TFNEAPKKEI    120
LKDMIEMCRG VQNPIRGLFL RYYLSQRTKE LLPEDDPSFN SQFIMNNFIE MNKLWVRLQH    180
QGPLRERETR TRERKELQIL VGSQLVRLSQ IIDDNFQMYK QDILPTILEQ VIQCRDLVSQ    240
EYLLDVICQV FADEFHLKTL DTLLQTTLHL NPDVSINKIV LTLVDRLNDY VTRQLEDDPN    300
ATSTNAYLDM DVFGTFWDYL TVLNHERPDL SLQQFIPLVE SVIVLSLKWY PNNFDNLNKL    360
FELVLQKTKD YGQKNISLES EHLFVLLLSF QNSKLQLTSS TTAPPNSPVT SKKHFIFQLI    420
SQCQAYKNIL ALQSISLQKK VVNEIIDILM DREVEEMADN DSESKLHPPG HSAYLVIEDK    480
```

```
LQVQRLLSIC EPLIISRSGP PANVASSDTN VDEVFFNRHD EEESWILDPI QEKLAHLIHW    540
IMNTTSRKQT MKNKIQFSLE AQLEILLLIK SSFIKGGINV KYTFPAIITN FWKLMRKCRM    600
IQEYLLKKRP DNKTLLSHYS NLLKQMFKFV SRCINDIFNS CNNSCTDLIL KLNLQCAILA    660
DQLQLNEISY DFFSQAFTIF EESLSDSKTQ LQALIYIAQS LQKTRSLYKE AYYDSLIVRC    720
TLHGSKLLKK QDQCRAVYLC SHLWWATEIS NIGEEEGITD NFYRDGKRVL ECLQRSLRVA    780
DSIMDNEQSC ELMVEILNRC LYYFIHGDES ETHISIKYIN GLIELIKTNL KSLKLEDNSA    840
SMITNSISDL HITGENNVKA SSNADDGSVI TDKESNVAIG SDGTYIQLNT LNGSSTLIRG    900
VVATASGSKL LHQLKYIPIH HFRRTCEYIE SQREVDDRFK VIYV                    944

SEQ ID NO: 8          moltype = AA   length = 674
FEATURE               Location/Qualifiers
source                1..674
                      mol_type = protein
                      organism = Saccharomyces cerevisiae
SEQUENCE: 8
MSRKNSKKLK VYYLPVTLTQ FQKDLSEILI SLHAKSFKAS LIGEPQADAV NKPSGLPAGP     60
ETHPYPTLSQ RQLTYIFDSN IRAIANHPSL LVDHYMPRQL LRMEPTESSI AGSHKFQVLN    120
QLINSICFRD REGSPNEVIK CAIIAHSIKE LDLLEGLILG KKFRTKRLSG TSLYNEKHKF    180
PNLPTVDSTI NKDGTPNSVS STSSNSNSTS YTGYSKDDYD YSVKRNLKKR KINTDDWLFL    240
ATTKHLKHDQ YLLANYDIDM IISFDPMLEI ELPALQVLRN NANKDIPIIK LLVQNSPDHY    300
LLDSEIKNSS VKSSHLSNNG HVDDSQEYEE IKSSLLYFLQ ARNAPVNNCE IDYIKLVKCC    360
LEGKDCNNIL PVLDLITLDE ASKDSSDSGF WQPQLTKLQY SSTELPLWDG PLDIKTYQTD    420
LMHRAVIRLR DIQDEYAKGT VPLYEKRLNE TQRQNLDEI KNSVGLTFKK KQEMEKSIND    480
SEKRLKHAMT ESTKLQNKIN HLLKIRQELE NFNKLPSNTT SSENHLEEGS ALADKLKEYI    540
DKNATLFNKL KELQQANAEK SKLNDELRSK YQIESSKAAE SAQTLKILRE SMKSLENEVN    600
GPLTKFSTES LKKELERLQN DFQSLKARNK FLKNYITLMN RQYDLKNKNN VQVEKAAANG    660
TRFRSTRSNT PNYT                                                     674

SEQ ID NO: 9          moltype = AA   length = 655
FEATURE               Location/Qualifiers
source                1..655
                      mol_type = protein
                      organism = Saccharomyces cerevisiae
SEQUENCE: 9
MDLLRILDTK PIPTIVDATT LGISGNTSGD YWLPTTMSLY QKELTDQIVS LHYSDILRYF     60
ETSHYKEDVI LESMKTMCLN GSLVATHPYL LIDHYMPKSL ITRDVPAHLA ENSGKFSVLR    120
DLINLVQEYE TETAIVCRPG RTMDLLEALL LGNKVHIKRY DGHSIKSQKR ANDFSCTVHL    180
FSSEGINFTK YPIKSKARFD MLICLDTTVD TSQKDIQYLL QYKRERKGLE RYAPIVRLVA    240
INSIDHCTLF FGKKFDKNSR EYLENVTAAM VILRDRLGTL PPDLRPIYSQ KLHYLVEWLE    300
NPTVPWPLPD IYPLKQYTSM DVERSLLTEV HFKKSDDQLE DAFSNCSKKR GRHGANKAAS    360
STVAGIEDNI TPSFYSTKRL KNDYYTNPLK QDMTQLTGIT TADNSSNVNY HLSSGIITHK    420
LIQSMGEVYM DICVQKQELD DYSCLDDLQN DHLKFFSNED EKIIKEYETV LRTNNDNLNR    480
SHELEVENNL KFSQIETLEK DIETLKGSLM AQGETLSKLK DAFVKTDNVQ DEIEKEERIS    540
VSRDTEKKYM EQEIKRAVDA IRENEEETHK LNEKKNGLES ELKLKFGKSE ISTKELNEKI    600
GFLKKELKLE NDLNEELMGQ LSKTMDNLEN LTIPRVRTQN GNTKKKSKAK KPGNV         655

SEQ ID NO: 10         moltype = AA   length = 569
FEATURE               Location/Qualifiers
source                1..569
                      mol_type = protein
                      organism = Saccharomyces cerevisiae
SEQUENCE: 10
MSFQIETVPT KPYEDQKPGT SGLRKKTKVF KDEPNYTENF IQSIMEAIPE GSKGATLVVG     60
GDGRYYNDVI LHKIAAIGAA NGIKKLVIGQ HGLLSTPAAS HIMRTYEEKC TGGIILTASH    120
NPGGPENDMG IKYNLSNGGP APESVTNAIW EISKKLTSYL IKDFPELDL GTIGKNKKYG    180
PLLVDIIDIT KDYVTFLKEI FDFDLIKKFI DNQRSTKNWK LLFDSMNGVT GPYGKAIFVD    240
EFGLPADEVL QNWHPSPDFG GMHPDPNLTY ASSLVKRVDR EKIEFGAASD GDGDRNMIYG    300
YGPSFVSPGD SVAIIAEYAA EIPYFAKQGI YGLARSFPTS GAIDRVAKAH GLNCYEVPTG    360
WKFFCALFDA KKLSICGEES FGTGSNHVRE KDGVWAIMAN LNILAIYNKH HPENEASIKT    420
IQNEFWAKYG RTFFTRYDFE KVETEKANKI VDQLRAYVTK SGVVNSAFPA DESLKVTDCG    480
DFSYTDLDGS VSDHQGLYVK LSNGARFVLR LSGTGSSGAT IRLYIEKYCD DKSQYQKTAE    540
EYLKPIINSV IKFLNFKQVL GTEEPTVRT                                     569

SEQ ID NO: 11         moltype = AA   length = 870
FEATURE               Location/Qualifiers
source                1..870
                      mol_type = protein
                      organism = Saccharomyces cerevisiae
SEQUENCE: 11
MSTTLAAPAK LKSLLLNLHT HCIGLHVNDV TPKVYFKLLI RHLLQISRSN AAHPKLRRRA     60
QILLVSLFLS GVTLFSGVTY STFKIILKCY KFYKFPWKRR NRRPLIRRTR SQMQLDSGAR    120
IMYIPEVELV DRQSPDDNKF MNATDKKKRK RIFIPPKDND VYEHDKFLFK NVELERAKNS    180
QLFYSKFLNQ MNVLSKILIP TVFDKNFLLL TAQIFFLVMR TWLSLFVAKL DGQIVKNIIA    240
GRGRSFLWDL GCWFLIAVPA SYTNSAIKLL QRKLSLNFRV NLTRYIHDMY LDKRLTFYKL    300
IPFDAKASNV IKNIDNSITN DVAKFCDATC SVFANIAKPV IDLIFFSVYL RDNLGTVGVA    360
GIFVNYFITG FILRKYTPPL GKLAGERSAS DGDYYNYHLN MINNSEEIAF YQGTAVERTK    420
VKELYDVLME KMLLVDKVKF GYNMLEDYVL KYTWSGLGYV FASIPIVMST LATGINSEEK    480
NMKEFIVNKR LMLSLADAGS RLMHSIKDIS QLTGYTNRIF TLLSVLHRVH SLNFNYGAVP    540
SILSIRTEDA SRNSNLLPTT DNSQDAIRGT IQRNFNGIRL ENIDVIIPSV RASEGIKLIN    600
```

```
KLTFQIPLHI DPITSKSNSI QDLSKANDIK LPFLQGSGSS LLILGPNGCG KSSIQRIIAE    660
IWPVYNKNGL LSIPSENNIF FIPQKPYFSR GGTLRDQIIY PMSSDEFFDR GFRDKELVQI    720
LVEVKLDYLL KRGVGLTYLD AIADWKDLLS GGEKQRVNFA RIMFHKPLYV VLDEATNAIS    780
VDMEDYLFNL LKRYRFNFIS ISQRPTLIKY HEMLLEIGEN RDGKWQLQAV GTDEAITSID    840
NEIEEELERKL ERVKGWEDER TKLREKLEII                                    870

SEQ ID NO: 12           moltype = AA  length = 853
FEATURE                 Location/Qualifiers
source                  1..853
                        mol_type = protein
                        organism = Saccharomyces cerevisiae
SEQUENCE: 12
MISTASAFYQ KHRVNLLRSS YIILLLATLY NSNSSSSNNK TDKKDSESTV LENKKIEEGK     60
ETAVDREEDE SSKEELTIVS KHSTDSEDGA IIIDKESKTN HKGGERKGKV DFLFKLLLHD    120
KKCLILFITQ AILLNIRTLL SLRVATLDGQ LVSTLVRAQY ANFTKILLGK WMILGIPASF    180
INSLISYTTK LCAVTINRKV SDFLLSKYLS NHHTFYSVAS AESVSEIQDN LTKDIYTFSM    240
NSSLLLNQLL KPMLDLILCS FKLLTSNTSV MGEGTLALGL IVYASNSLLK LIQPNFTRLT    300
MASASLESWF RSLHSNLHSS NEEIALLRGQ KRELENVDYS FYRLVLFLNR EIKARAIYDV    360
ATAFVIKYTW GAAGLVLCSI PIFFKNKPSE DTLQLKEPGN DMTADFITNR RLLVTASSSI    420
GRFVELKRNI QQLRGIRLRL NKFNDLLDAN KGDDEKEPRD ERCIVEYDDS RIKFENIPLI    480
TPANQVLVPE LSFDLKHGNH LLIIGPNGCG KSSLFRILGG LWPIRATPNK NHQSKLIMPR    540
RTVDRDCAIF YLPQRPYMGN RSTFREQIIY PDSIEQFKER YHNDYDLGDA DLIKILQLLD    600
LEDLVTENMS LLLAQRTSKN DSQQLSTEDN QSPCAIKVRD AFSIVRNWSE ELTIGVQQRL    660
AMARMYYHKP KFAVLDECTS AVAPEMEQRM YENAQNFGIS LISVCHRTSL WHFHNYLLKF    720
DGKGGYQFGP FNPKERLCNE EKLLELNAIL DQQVPLWERK LKDLTIAKES NIIRKSETNL    780
NLFEKIEDPK TSKSNALFNA NKGQRITSPT GQETSKRLPL FSQPSSSASS NLLRNNKSLN    840
KKVKTKKEEG KER                                                       853

SEQ ID NO: 13           moltype = AA  length = 760
FEATURE                 Location/Qualifiers
source                  1..760
                        mol_type = protein
                        organism = Saccharomyces cerevisiae
SEQUENCE: 13
MKITCTDLVY VFILLFLNTS CVQAVFSDDA FITDWQLANL GPWEKVIPDS RDRNRVLILS     60
NPTETSCLVS SFNVSSGQIL FRNVLPFTID EIQLDSNDHN AMVCVNSSSN HWQKFDLHDW    120
FLLEEGVDNA PSTTILPQSS YLNDQVSIKN NELHILDEQS KLAEWKLELP QGFNKVEYFH    180
REDPLALVLN VNDTQYMGFS ANGTELIPVW QRDEWLTNVV DYAVLDVPDS RDVELNKDMK    240
AELDSNSLWN AYWLRLTTNW NRLINLLKEN QFSPGRVFTK LLALDAKDTT VSDLKFGFAK    300
ILIVLTHDGF IGGLDMVNKG QLIWKLDLEI DQGVKMFWTD KNHDELVVFS HDGHYLTIEV    360
TKDQPIIKSR SPLSERKTVD SVIRLNEHDH QYLIKFEDKD HLLFKLNPGK NTDVPIVANN    420
HSSSHIFVTE HDTNGIYGYI IENDTVKQTW KKAVNSKEKM VAYSKRETTN LNTLGITLGD    480
KSVLYKYLYP NLAAYLIANE EHHTITFNLI DTITGEILIT QEHKDSPDFR FPMDIVFGEY    540
WVYSYFSSE PVPEQKLVVV ELYESLTPDE RLSNSSDNFS YDPLTGHINK PQFQTKQFIF    600
PEIIKTMSIS KTTDDITTKA IVMELENGQI TYIPKLLLNA RGKPAEEMAK DKKKEFMATP    660
YTPVIPINDN FIITHFRNLL PGSDSQLISI PTNLESTSII CDLGLDVFCT RITPSGQFDL    720
MSPTFEKGKL LITIFVLLVI TYFIRPSVSN KKLKSQWLIK                           760

SEQ ID NO: 14           moltype = AA  length = 117
FEATURE                 Location/Qualifiers
source                  1..117
                        mol_type = protein
                        organism = Saccharomyces cerevisiae
SEQUENCE: 14
MSSSTPFDPY ALSEHDEERP QNVQSKSRTA ELQAEIDDTV GIMRDNINKV AERGERLTSI     60
EDKADNLAVS AQGFKRGANR VRKAMWYKDL KMKMCLALVI IILLVVIIVP IAVHFSR       117

SEQ ID NO: 15           moltype = AA  length = 115
FEATURE                 Location/Qualifiers
source                  1..115
                        mol_type = protein
                        organism = Saccharomyces cerevisiae
SEQUENCE: 15
MSSSVPYDPY VPPEESNSGA NPNSQNKTAA LRQEIDDTVG IMRDNINKVA ERGERLTSIE     60
DKADNLAISA QGFKRGANRV RKQMWWKDLK MRMCLFLVVI ILLVVIIVPI VVHFS         115

SEQ ID NO: 16           moltype = AA  length = 403
FEATURE                 Location/Qualifiers
source                  1..403
                        mol_type = protein
                        organism = Saccharomyces cerevisiae
SEQUENCE: 16
MTIAPMANDL EDFESLLEPT FDAKQFGNDL LKATNNNDTT ILDLNTPLKK LNYDLHEIDS     60
RIDQLMNSNP LEIIELIYKN EHVNSTIVGE LKPSLEYMNM SYDRLKNQVL DPYERARKVQ    120
LALSKVYQTS FLLRGALLYI HLSNKLNALS KTAQLSTSTA INLASLHYQL EITLDENKNL    180
KSLRIKQLD QDIVSPNKRE LITFLSLQMC KECLNSIKIK SNKEIISQLA YSLYLLSSQE    240
FESAINKIVL SNVTMSSQIL SKILNSIRMF PDAFNEVVEK GYNIYILETL LRNIKTDNVT    300
NSSRSIAANK SRLGNLLSEY TSMKSKAGSG TPRDLFWSKV SSAFKKDFEI SVNRGGPVGK    360
SLLKNKDFII NTMKQSMKKS SDNSDYQSYL DVMLNSVSIS LNK                      403
```

```
SEQ ID NO: 17           moltype = DNA   length = 1569
FEATURE                 Location/Qualifiers
source                  1..1569
                        mol_type = genomic DNA
                        organism = Saccharomyces cerevisiae
SEQUENCE: 17
atgaagtttt ctgctggtgc cgtcctgtca tggtcctccc tgctgctcgc ctcctctgtt   60
ttcgcccaac aagaggctgt ggcccctgaa gactccgctg tcgttaagtt ggccaccgac  120
tccttcaatg agtacattca gtcgcacgac ttggtgcttg cggagttttt tgctccatgg  180
tgtggccact gtaagaacat ggctcctgaa tacgttaaag ccgccgagac tttagttgag  240
aaaaacatta ccttggccca gatcgactgt actgaaaaac aggatctgtg tatgaacac   300
aacattccag ggttcccaag cttgaagatt tcaaaaaca gcgatgttaa caactcgatc  360
gattacgagg gacctagaac tgccgaggcc attgtccaat tcatgatcaa gcaaagccaa  420
ccggctgtcg ccgttgttgc tgatctacca gcttacctg ctaacgagac ttttgtcact   480
ccagttatcg tccaatccgg taagattgac gccgacttca cgccacctt ttactccatg   540
gccaacaaac acttcaacga ctacgacttt gtctccgctg aaaacgcaga cgatgattc   600
aagcttttcta tttacttgcc ctccgccatg gacgagcctg tagtatacaa cggtaagaaa  660
gccgatatcg ctgacgctga tgttttttgaa aatggttgc aagtggaagc cttgccctac  720
tttggtgaaa tcgacggttc cgttttcgcc caatacgtcg aaagcggttt gccttttgggt 780
tactattct acaatgacga ggaagaattg gaagaataca agcctctctt taccgagttg  840
gccaaaaaga acagaggtct aatgaacttt gttagcatcg atgccagaaa attcggcgga  900
cacgccggca acttgaacat gaaggaacaa ttccctctat ttgccatcca cgacatgact  960
gaagacttga agtacggttt gcctcaactc tctgaagagg cgtttgacga attgagcgac 1020
aagatcgtgt tggagtctaa ggctattgaa tctttggtta aggacttctt gaaaggtgat 1080
gcctcccaa tcgtgaagtc ccaagagatc ttcgagaacc aagttcctca tgtcttccaa 1140
ttggtcggta agaaccatga cgaaatcgtc aacgacccaa agaaggacgt tcttgttttg 1200
tactatgccc catggtgtgg tcactgtaag agattggccc caacttacca agaactagct 1260
gatacctacg ccaacgccac atccgacgtt tgattgcta aactagacca cactgaaaac 1320
gatgtcagag gcgtcgtaat tgaaggttac ccaacaatgc tcttatacc aggtggtaag 1380
aagtccgaat ctgttgtgta ccaaggttca agatccttgg actctttatt cgacttcatc 1440
aaggaaaacg tcacttcga cgtcgacggt aaggccttgt acgaagaagc ccaggaaaaa 1500
gctgctgagg aagccgatgc tgacgctgaa ttggctgacg aagaagatgc cattcacgat 1560
gaattgtaa                                                         1569

SEQ ID NO: 18           moltype = DNA   length = 2502
FEATURE                 Location/Qualifiers
source                  1..2502
                        mol_type = genomic DNA
                        organism = Saccharomyces cerevisiae
SEQUENCE: 18
atgaataatg ctgcaaatac agggacgacc aatgagtcaa acgtgagcga tgctccccgt   60
attgagcctt taccaagctt gaatgatgat gacattgaaa aaatcttaca accgaacgat  120
atctttacga ccgatcgtac cgatgcaagt actacatctt ccacagccat tgaagatatt  180
attaacccct cattggatcc gcagtcagca gcatcgccgg ttccttcttc ctctttttttc 240
catgactcaa ggaaaccttc caccagtaca catttagtaa ggagaggtac tccattggga  300
atttaccaaa ccaatctata cggtcacaat agcagagaaa atactaatcc taatagtaca  360
ttattatctt ctaagttact cgcgcatcca ccagttcctt atgggcaaaa tcccgattta  420
ctacaacatg ctgtgtacag ggcacagccg tcaagtggaa ccactaacgc gcaaccgcgc  480
caaaccacaa gaagatatca atcccataaa tcacggcctg catttgttaa taaactatgg  540
agcatgttaa acgatgattc taatacgaaa cttatacagt gggcggagga tggaaaatct  600
tttattgtca cgaataggga ggaatttgtg caccaaattt taccaaaata ttttaaacat  660
tccaatttcg cttcctttgt aagacaattg aacatgtatg gatggcataa agttcaagat  720
gtcaagtcag gatcaattca aagtagttca gatgataagt ggcaatttga aaatgaaaac  780
ttcattagag gtagagaaga tttgctggaa aaaataatca ggcagaaagg ttcctccaat  840
aaccataata gccctagtgg taacggtaat ccagcgaatg gtagcaacat ccctctggac  900
aatgccgcag gaagtaataa tagcaataat aacatcagta gtagtaattc attttttaac  960
aatggtcatt tattgcaggg taaaacacta agattaatga acgaagcgaa tcttggagat 1020
aagaatgatg tcaccgcgat tttggggaag ttagagcaaa taaaatataa ccagattgca 1080
atttccaaag atttactaag aataactaag gataatgagt tattatggca agagaatatg 1140
atggccaggg aaagacatag aacccaacag caagccttgg aaaaatgtt cagattcttg 1200
acatctatag tcccacactt agatcccaaa atgattatgg acgggctggg agatccgaaa 1260
gttaataatg aaaagctaaa cagtgcgaat aacattgggt taaatcgcga caacacaggc 1320
actatagatg aactaaaatc caacgattct ttcataaacg atgatcgtaa ttctttcaac 1380
aatgctacaa ccaacgcccg taataacatg agtcccaaca atgatgacaa tagtattgac 1440
accgctagca ctaataccac caacagaaag aaaaatatag atgaaaacat caaaaataac 1500
aacgacataa ttaatgacat tatatttaat accaaccttg ccaacaatct cagcaattac 1560
aattccaaca ataatctggg ctcgccaata aggccctata aacaaagata tcttttgaaa 1620
aatagagcca attcctcgac atcgagtgag aatccaagcc taacgcccct tgatatcgaa 1680
tctaataatg accgcaaaat ttcagaaatt cctttttgatg acgaagaaga agaagaaacg 1740
gattttaggc cttttacctc gcgagatcct aataaccaaa cgagtgaaaa cacttttgat 1800
ccaaacagat ttacgatgct ctctgatgat gatttaaaaa aagattctca taccaatgac 1860
aataaacaca acgaaagtga tctttttttgg gacaacgtac atagaaatat agacgaacaa 1920
gatgcaagac tccagaactt ggaaaatatg gttcaatact tttctcctgg atatcctaat 1980
aagtcgttca caacaaaac ttcctcgaca aacactaatt ccaatatgga aagtgctgtc 2040
aacgttaata gccctggttt caacttacag gattatttaa ctggagagtc taattccccc 2100
aattctgttc attctgttcc ctccaatggc agcggctcca caccgttgcc catgccaaat 2160
gataatgaca ccgagcacgc aagtacaagt gtcaatcaag gcgaaatgg aagcggatta 2220
acgccccttcc tcacggtaga tgatcacaca ctaaacgaca ataacactag tgagggaagt 2280
```

```
acaagggtgt cccccgatat aaagttcagc gccactgaaa acactaaagt gagtgataac   2340
ctgccaagct ttaatgacca cagttattcc acccaggccg acacggcgcc cgagaacgct   2400
aagaaaagat ttgtggagga aataccggaa ccggctatag tcgaaataca ggacccgaca   2460
gagtacaacg atcaccgcct gcccaaacga gctaagaaat ag                      2502
```

```
SEQ ID NO: 19              moltype = AA   length = 238
FEATURE                    Location/Qualifiers
source                     1..238
                           mol_type = protein
                           organism = Saccharomyces cerevisiae
SEQUENCE: 19
MEMTDFELTS NSQSNLAIPT NFKSTLPPRK RAKTKEEKEQ RRIERILRNR RAAHQSREKK    60
RLHLQYLERK CSLLENLLNS VNLEKLADHE DALTCSHDAF VASLDEYRDF QSTRGASLDT   120
RASSHSSSDT FTPSPLNCTM EPATLSPKSM RDSASDQETS WELQMFKTEN VPESTTLPAV   180
DNNNLFDAVA SPLADPLCDD IAGNSLPFDN SIDLDNWRNP EAQSGLNSFE LNDFFITS     238

SEQ ID NO: 20              moltype = DNA   length = 41
FEATURE                    Location/Qualifiers
misc_feature               1..41
                           note = Primer
source                     1..41
                           mol_type = other DNA
                           organism = synthetic construct
SEQUENCE: 20
actgcggccg caacaaaatg tcttacagag gacctattgg a                        41

SEQ ID NO: 21              moltype = DNA   length = 40
FEATURE                    Location/Qualifiers
misc_feature               1..40
                           note = Primer
source                     1..40
                           mol_type = other DNA
                           organism = synthetic construct
SEQUENCE: 21
cgtgagctcc tagtaaatct tcttcttttc atcaacggat                          40

SEQ ID NO: 22              moltype = DNA   length = 37
FEATURE                    Location/Qualifiers
misc_feature               1..37
                           note = Primer
source                     1..37
                           mol_type = other DNA
                           organism = synthetic construct
SEQUENCE: 22
tcaggatcca acaaaatgac aatagcgcca atgcaa                              37

SEQ ID NO: 23              moltype = DNA   length = 45
FEATURE                    Location/Qualifiers
misc_feature               1..45
                           note = Primer
source                     1..45
                           mol_type = other DNA
                           organism = synthetic construct
SEQUENCE: 23
ccaggtacct cacttattta gagaaataga tactgagttt agcat                    45

SEQ ID NO: 24              moltype = DNA   length = 38
FEATURE                    Location/Qualifiers
misc_feature               1..38
                           note = Primer
source                     1..38
                           mol_type = other DNA
                           organism = synthetic construct
SEQUENCE: 24
actgcggccg caacaaaatg aagttttctg ctggtgcc                            38

SEQ ID NO: 25              moltype = DNA   length = 37
FEATURE                    Location/Qualifiers
misc_feature               1..37
                           note = Primer
source                     1..37
                           mol_type = other DNA
                           organism = synthetic construct
SEQUENCE: 25
cgtgagctct tacaattcat cgtgaatggc atcttct                             37

SEQ ID NO: 26              moltype = DNA   length = 80
FEATURE                    Location/Qualifiers
misc_feature               1..80
```

```
                        note          = Primer
source                  1..80
                        mol_type      = other DNA
                        organism      = synthetic construct
SEQUENCE: 26
atgagtagga aaaattctaa gaaactaaaa gtctattact tacctgtaac gctaacccaa    60
gacatggagg cccagaatac                                                80

SEQ ID NO: 27           moltype = DNA  length = 113
FEATURE                 Location/Qualifiers
misc_feature            1..113
                        note          = Primer
source                  1..113
                        mol_type      = other DNA
                        organism      = synthetic construct
SEQUENCE: 27
aaatctctct atattataca ggctacttct tttaggaaac gtcacattca ttagtcgata    60
gtattgtatc tattttcttt attttcaca caccagtata gcgaccagca ttc           113

SEQ ID NO: 28           moltype = DNA  length = 83
FEATURE                 Location/Qualifiers
misc_feature            1..83
                        note          = Primer
source                  1..83
                        mol_type      = other DNA
                        organism      = synthetic construct
SEQUENCE: 28
atggactacg aggataatct agaagcacct gtttgggacg aactaaatca tgagggagat    60
aaagacatgg aggcccagaa tac                                            83

SEQ ID NO: 29           moltype = DNA  length = 113
FEATURE                 Location/Qualifiers
misc_feature            1..113
                        note          = Primer
source                  1..113
                        mol_type      = other DNA
                        organism      = synthetic construct
SEQUENCE: 29
ataaatcctg aggaacgtga cacataaagt tattgtatac agatcatcta ttaggcttgt    60
tattgcagga tgtatgaaag tttataaaat ccccagtata gcgaccagca ttc           113

SEQ ID NO: 30           moltype = DNA  length = 84
FEATURE                 Location/Qualifiers
misc_feature            1..84
                        note          = Primer
source                  1..84
                        mol_type      = other DNA
                        organism      = synthetic construct
SEQUENCE: 30
atgagctcac aaccgtcttt cgtcaccata aggggcaagg ccatttctct agaaacacaa    60
acgggacatg gaggcccaga atac                                           84

SEQ ID NO: 31           moltype = DNA  length = 113
FEATURE                 Location/Qualifiers
misc_feature            1..113
                        note          = Primer
source                  1..113
                        mol_type      = other DNA
                        organism      = synthetic construct
SEQUENCE: 31
agattcttgt tatgttttta catacgttgt ttaataaaag tcgttattta tcagtggtgt    60
ggttgcttgt ctggaattgg cttttccct gtgcagtata gcgaccagca ttc            113

SEQ ID NO: 32           moltype = DNA  length = 82
FEATURE                 Location/Qualifiers
misc_feature            1..82
                        note          = Primer
source                  1..82
                        mol_type      = other DNA
                        organism      = synthetic construct
SEQUENCE: 32
atgggtgaag attttatgca cccaccgttt caaacgtacc cttcaaagaa cagcgaaggg    60
aagacatgga ggcccagaat ac                                             82

SEQ ID NO: 33           moltype = DNA  length = 113
FEATURE                 Location/Qualifiers
misc_feature            1..113
                        note          = Primer
source                  1..113
```

```
                        mol_type = other DNA
                        organism = synthetic construct
SEQUENCE: 33
caaatttgtg catatacttt tcttgacctt attactcctc ggcttgatta tcattataaa    60
cactattcct tctgttgctt ggttaaaatg ctacagtata gcgaccagca ttc           113

SEQ ID NO: 34           moltype = DNA   length = 92
FEATURE                 Location/Qualifiers
misc_feature            1..92
                        note = Primer
source                  1..92
                        mol_type = other DNA
                        organism = synthetic construct
SEQUENCE: 34
atgacttcgg ctgtacctta tgatccatat gatgatctgg ataacaatcc atttgctgag    60
ccccaggagg aagacatgga gcccagaat ac                                   92

SEQ ID NO: 35           moltype = DNA   length = 117
FEATURE                 Location/Qualifiers
misc_feature            1..117
                        note = Primer
source                  1..117
                        mol_type = other DNA
                        organism = synthetic construct
SEQUENCE: 35
aaagatcacc ttgttcaaag gtatgaattt tctactttat atacgtatta tcatgttcag    60
aggatagatg gattgactaa gggtacagta cggcaaacag tatagcgacc agcattc      117

SEQ ID NO: 36           moltype = DNA   length = 20
FEATURE                 Location/Qualifiers
misc_feature            1..20
                        note = Primer
source                  1..20
                        mol_type = other DNA
                        organism = synthetic construct
SEQUENCE: 36
gacatggagg cccagaatac                                                20

SEQ ID NO: 37           moltype = DNA   length = 20
FEATURE                 Location/Qualifiers
misc_feature            1..20
                        note = Primer
source                  1..20
                        mol_type = other DNA
                        organism = synthetic construct
SEQUENCE: 37
cagtatagcg accagcattc                                                20

SEQ ID NO: 38           moltype = DNA   length = 117
FEATURE                 Location/Qualifiers
misc_feature            1..117
                        note = Primer
source                  1..117
                        mol_type = other DNA
                        organism = synthetic construct
SEQUENCE: 38
ttctagaaga tgagagaaga gggaataatg agaaaggcga aaaataaagg cacacaccat    60
agcttcaaaa tgtttctact cctttttac tcttccagac atggaggccc agaatac       117

SEQ ID NO: 39           moltype = DNA   length = 87
FEATURE                 Location/Qualifiers
misc_feature            1..87
                        note = Primer
source                  1..87
                        mol_type = other DNA
                        organism = synthetic construct
SEQUENCE: 39
aagttaagtg cgcagaaagt aatatcatgc gtcaatcgta tgtgaatgct ggtcgctata    60
ctggcacaca ccatagcttc aaaatgt                                       87

SEQ ID NO: 40           moltype = DNA   length = 24
FEATURE                 Location/Qualifiers
misc_feature            1..24
                        note = Primer
source                  1..24
                        mol_type = other DNA
                        organism = synthetic construct
SEQUENCE: 40
gacaaacttg gaatgtaagg cttc                                           24
```

```
SEQ ID NO: 41          moltype = DNA   length = 118
FEATURE                Location/Qualifiers
misc_feature           1..118
                       note = Primer
source                 1..118
                       mol_type = other DNA
                       organism = synthetic construct
SEQUENCE: 41
attttttgtt agacatataa ttttatatca ttattcttat tattcttata ggaagtacct   60
tcaaagaatg gggtcttatc ttgttttgca agtaccacga catggaggcc cagaatac    118

SEQ ID NO: 42          moltype = DNA   length = 88
FEATURE                Location/Qualifiers
misc_feature           1..88
                       note = Primer
source                 1..88
                       mol_type = other DNA
                       organism = synthetic construct
SEQUENCE: 42
aagttaagtg cgcagaaagt aatatcatgc gtcaatcgta tgtgaatgct ggtcgctata   60
ctgggaagta ccttcaaaga atggggtc                                     88

SEQ ID NO: 43          moltype = DNA   length = 25
FEATURE                Location/Qualifiers
misc_feature           1..25
                       note = Primer
source                 1..25
                       mol_type = other DNA
                       organism = synthetic construct
SEQUENCE: 43
tatctccaat gggttgctat tcatc                                        25

SEQ ID NO: 44          moltype = DNA   length = 118
FEATURE                Location/Qualifiers
misc_feature           1..118
                       note = Primer
source                 1..118
                       mol_type = other DNA
                       organism = synthetic construct
SEQUENCE: 44
gcattttgtt gtgctgttac aaccacaaca aaacgaaaaa cccgtatgga tccaactggc   60
accgctggct tgaacaacaa taccagcctt ccaacttcga catggaggcc cagaatac    118

SEQ ID NO: 45          moltype = DNA   length = 84
FEATURE                Location/Qualifiers
misc_feature           1..84
                       note = Primer
source                 1..84
                       mol_type = other DNA
                       organism = synthetic construct
SEQUENCE: 45
aagttaagtg cgcagaaagt aatatcatgc gtcaatcgta tgtgaatgct ggtcgctata   60
ctgtccaact ggcaccgctg gctt                                         84

SEQ ID NO: 46          moltype = DNA   length = 117
FEATURE                Location/Qualifiers
misc_feature           1..117
                       note = Primer
source                 1..117
                       mol_type = other DNA
                       organism = synthetic construct
SEQUENCE: 46
acagcctctt gttgggcgaa aacagaggag gcgagcagca gggaggacca tgacaggacg   60
gcaccagcag aaaacttcat tttgaatatg tattacttgg ttatggttat atatgac     117

SEQ ID NO: 47          moltype = DNA   length = 118
FEATURE                Location/Qualifiers
misc_feature           1..118
                       note = Primer
source                 1..118
                       mol_type = other DNA
                       organism = synthetic construct
SEQUENCE: 47
gttcaatagt gtggttggta accaaatttt ctaggcgttg ttgaaaataa tcattagtgc   60
ccaccgtttg agcgtggtgt gacaccacgc ccaagataga catggaggcc cagaatac    118

SEQ ID NO: 48          moltype = DNA   length = 95
FEATURE                Location/Qualifiers
```

```
misc_feature            1..95
                        note = Primer
source                  1..95
                        mol_type = other DNA
                        organism = synthetic construct
SEQUENCE: 48
cccagatgcg aagttaagtg cgcagaaagt aatatcatgc gtcaatcgta tgtgaatgct    60
ggtcgctata ctgtcattag tgcccaccgt ttgag                               95

SEQ ID NO: 49           moltype = DNA   length = 99
FEATURE                 Location/Qualifiers
misc_feature            1..99
                        note = Primer
source                  1..99
                        mol_type = other DNA
                        organism = synthetic construct
SEQUENCE: 49
attacgaaat ggcctgtatg ggtagattct tgttatgttt ttacatacgt tgtttaataa    60
aagtcgttat tcaattacaa ttcatcgtga atggcatct                           99

SEQ ID NO: 50           moltype = DNA   length = 21
FEATURE                 Location/Qualifiers
misc_feature            1..21
                        note = Primer
source                  1..21
                        mol_type = other DNA
                        organism = synthetic construct
SEQUENCE: 50
cccagatgcg aagttaagtg c                                              21

SEQ ID NO: 51           moltype = DNA   length = 25
FEATURE                 Location/Qualifiers
misc_feature            1..25
                        note = Primer
source                  1..25
                        mol_type = other DNA
                        organism = synthetic construct
SEQUENCE: 51
attacgaaat ggcctgtatg ggtag                                          25

SEQ ID NO: 52           moltype = DNA   length = 118
FEATURE                 Location/Qualifiers
misc_feature            1..118
                        note = Primer
source                  1..118
                        mol_type = other DNA
                        organism = synthetic construct
SEQUENCE: 52
tactcttgtt caatcagtta gttatctttg ttcaatagtg tggttggtaa gcacacacca    60
tagcttcaaa atgtttctac tccttttta ctcttccaga catggaggcc cagaatac     118

SEQ ID NO: 53           moltype = DNA   length = 97
FEATURE                 Location/Qualifiers
misc_feature            1..97
                        note = Primer
source                  1..97
                        mol_type = other DNA
                        organism = synthetic construct
SEQUENCE: 53
cccagatgcg aagttaagtg cgcagaaagt aatatcatgc gtcaatcgta tgtgaatgct    60
ggtcgctata ctggcacaca ccatagcttc aaaatgt                             97

SEQ ID NO: 54           moltype = DNA   length = 100
FEATURE                 Location/Qualifiers
misc_feature            1..100
                        note = Primer
source                  1..100
                        mol_type = other DNA
                        organism = synthetic construct
SEQUENCE: 54
attacgaaat ggcctgtatg ggtagattct tgttatgttt ttacatacgt tgtttaataa    60
aagtcgttat tcattacaat tcatcgtgaa tggcatcttc                         100

SEQ ID NO: 55           moltype = DNA   length = 20
FEATURE                 Location/Qualifiers
misc_feature            1..20
                        note = Primer
source                  1..20
                        mol_type = other DNA
```

```
                              organism = synthetic construct
SEQUENCE: 55
ttaccacggt gctccagttg                                                    20

SEQ ID NO: 56              moltype = DNA   length = 20
FEATURE                    Location/Qualifiers
misc_feature               1..20
                           note = Primer
source                     1..20
                           mol_type = other DNA
                           organism = synthetic construct
SEQUENCE: 56
aaccaagtca gcagcagaag                                                    20

SEQ ID NO: 57              moltype = DNA   length = 20
FEATURE                    Location/Qualifiers
misc_feature               1..20
                           note = Primer
source                     1..20
                           mol_type = other DNA
                           organism = synthetic construct
SEQUENCE: 57
tgcggcacag aagagtaacc                                                    20

SEQ ID NO: 58              moltype = DNA   length = 20
FEATURE                    Location/Qualifiers
misc_feature               1..20
                           note = Primer
source                     1..20
                           mol_type = other DNA
                           organism = synthetic construct
SEQUENCE: 58
ggcgataaac gataggcaac                                                    20

SEQ ID NO: 59              moltype = DNA   length = 22
FEATURE                    Location/Qualifiers
misc_feature               1..22
                           note = Primer
source                     1..22
                           mol_type = other DNA
                           organism = synthetic construct
SEQUENCE: 59
tccgctaaga acaactaagt ga                                                 22

SEQ ID NO: 60              moltype = DNA   length = 22
FEATURE                    Location/Qualifiers
misc_feature               1..22
                           note = Primer
source                     1..22
                           mol_type = other DNA
                           organism = synthetic construct
SEQUENCE: 60
cactggctgt aaacggacct at                                                 22

SEQ ID NO: 61              moltype = DNA   length = 21
FEATURE                    Location/Qualifiers
misc_feature               1..21
                           note = Primer
source                     1..21
                           mol_type = other DNA
                           organism = synthetic construct
SEQUENCE: 61
tgcaaaccca gtgtaagacg c                                                  21

SEQ ID NO: 62              moltype = DNA   length = 22
FEATURE                    Location/Qualifiers
misc_feature               1..22
                           note = Primer
source                     1..22
                           mol_type = other DNA
                           organism = synthetic construct
SEQUENCE: 62
atatggttcg agaacaggca tc                                                 22

SEQ ID NO: 63              moltype = DNA   length = 22
FEATURE                    Location/Qualifiers
misc_feature               1..22
                           note = Primer
source                     1..22
```

```
                            mol_type = other DNA
                            organism = synthetic construct
SEQUENCE: 63
agcacgacat agaagtgaaa cc                                                    22

SEQ ID NO: 64               moltype = DNA   length = 22
FEATURE                     Location/Qualifiers
misc_feature                1..22
                            note = Primer
source                      1..22
                            mol_type = other DNA
                            organism = synthetic construct
SEQUENCE: 64
cgcaagggca aacaggatag ac                                                    22

SEQ ID NO: 65               moltype = DNA   length = 21
FEATURE                     Location/Qualifiers
misc_feature                1..21
                            note = Primer
source                      1..21
                            mol_type = other DNA
                            organism = synthetic construct
SEQUENCE: 65
cgattgagtc gaacaccctg a                                                     21

SEQ ID NO: 66               moltype = DNA   length = 19
FEATURE                     Location/Qualifiers
misc_feature                1..19
                            note = Primer
source                      1..19
                            mol_type = other DNA
                            organism = synthetic construct
SEQUENCE: 66
cttgggtgcg taggtctgg                                                        19

SEQ ID NO: 67               moltype = DNA   length = 22
FEATURE                     Location/Qualifiers
misc_feature                1..22
                            note = Primer
source                      1..22
                            mol_type = other DNA
                            organism = synthetic construct
SEQUENCE: 67
gtcttgtaac caatggcgaa ac                                                    22

SEQ ID NO: 68               moltype = DNA   length = 20
FEATURE                     Location/Qualifiers
misc_feature                1..20
                            note = Primer
source                      1..20
                            mol_type = other DNA
                            organism = synthetic construct
SEQUENCE: 68
gccaccacga ttgacgaaca                                                       20

SEQ ID NO: 69               moltype = DNA   length = 22
FEATURE                     Location/Qualifiers
misc_feature                1..22
                            note = Primer
source                      1..22
                            mol_type = other DNA
                            organism = synthetic construct
SEQUENCE: 69
ttaacagcga cttgcccaca gg                                                    22

SEQ ID NO: 70               moltype = DNA   length = 21
FEATURE                     Location/Qualifiers
misc_feature                1..21
                            note = Primer
source                      1..21
                            mol_type = other DNA
                            organism = synthetic construct
SEQUENCE: 70
agctagtctg tgacctgtac g                                                     21

SEQ ID NO: 71               moltype = DNA   length = 26
FEATURE                     Location/Qualifiers
misc_feature                1..26
                            note = Primer
```

-continued

```
source                  1..26
                        mol_type = other DNA
                        organism = synthetic construct
SEQUENCE: 71
tgcacgtgat aatatgttac cctgtc                                              26

SEQ ID NO: 72           moltype = DNA  length = 26
FEATURE                 Location/Qualifiers
misc_feature            1..26
                        note = Primer
source                  1..26
                        mol_type = other DNA
                        organism = synthetic construct
SEQUENCE: 72
ggaggaggat gagataagta gtttcc                                              26

SEQ ID NO: 73           moltype = DNA  length = 22
FEATURE                 Location/Qualifiers
misc_feature            1..22
                        note = Primer
source                  1..22
                        mol_type = other DNA
                        organism = synthetic construct
SEQUENCE: 73
aaaactctgg cggctaaact gg                                                  22

SEQ ID NO: 74           moltype = DNA  length = 25
FEATURE                 Location/Qualifiers
misc_feature            1..25
                        note = Primer
source                  1..25
                        mol_type = other DNA
                        organism = synthetic construct
SEQUENCE: 74
catcaatact ggcgataagc gggac                                               25

SEQ ID NO: 75           moltype = DNA  length = 27
FEATURE                 Location/Qualifiers
misc_feature            1..27
                        note = Primer
source                  1..27
                        mol_type = other DNA
                        organism = synthetic construct
SEQUENCE: 75
tccttggact ctttattcga cttcatc                                             27

SEQ ID NO: 76           moltype = DNA  length = 22
FEATURE                 Location/Qualifiers
misc_feature            1..22
                        note = Primer
source                  1..22
                        mol_type = other DNA
                        organism = synthetic construct
SEQUENCE: 76
cgcattataa gtggtgtgcc ga                                                  22

SEQ ID NO: 77           moltype = DNA  length = 22
FEATURE                 Location/Qualifiers
misc_feature            1..22
                        note = Primer
source                  1..22
                        mol_type = other DNA
                        organism = synthetic construct
SEQUENCE: 77
atgctgtgct gggtgtttt ga                                                   22
```